US012687750B2

(12) United States Patent
Chen et al.

(10) Patent No.:  US 12,687,750 B2
(45) Date of Patent:      Jul. 21, 2026

(54) LIGHT-ADJUSTING GLASS, MANUFACTURING METHOD THEREOF AND VEHICLE

(71) Applicants: Beijing BOE Sensor Technology Co., Ltd., Beijing (CN); BOE Technology Group Co., Ltd., Beijing (CN)

(72) Inventors: Juan Chen, Beijing (CN); Peng Liang, Beijing (CN); Changyin Wang, Beijing (CN); Chunlei Wang, Beijing (CN); Deshen Zhai, Beijing (CN); Xiaoqian Ju, Beijing (CN); Sikai Zhang, Beijing (CN); Ying Wang, Beijing (CN); Chuncheng Che, Beijing (CN); Xiaolong Wu, Beijing (CN); Zhan Li, Beijing (CN)

(73) Assignees: BEIJING BOE SENSOR TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 33 days.

(21) Appl. No.: 18/716,385

(22) PCT Filed: Dec. 31, 2021

(86) PCT No.: PCT/CN2021/143750
§ 371 (c)(1),
(2) Date: Jun. 4, 2024

(87) PCT Pub. No.: WO2023/123384
PCT Pub. Date: Jul. 6, 2023

(65) Prior Publication Data
US 2025/0044648 A1    Feb. 6, 2025

(51) Int. Cl.
*G02F 1/1341*        (2006.01)
*G02F 1/1333*        (2006.01)
(Continued)

(52) U.S. Cl.
CPC ...... *G02F 1/1341* (2013.01); *G02F 1/133305* (2013.01); *G02F 1/1337* (2013.01);
(Continued)

(58) Field of Classification Search
CPC ............. G02F 1/1341; G02F 1/133305; G02F 1/1337; G02F 1/1339; G02F 1/134309
See application file for complete search history.

(56) References Cited

U.S. PATENT DOCUMENTS

2001/0017675 A1*  8/2001  Inoue .................... G02F 1/1334
                                                                349/86
2021/0055463 A1*  2/2021  Lee ........................ G02F 1/1339
2022/0252943 A1*  8/2022  Kuroda ............. G02F 1/133707

FOREIGN PATENT DOCUMENTS

CN        102116958 A      7/2011
CN        102981303 A      3/2013
(Continued)

OTHER PUBLICATIONS

Espacenet english translation of WO2019240136A (Year: 2019).*
First Office Action issued on Jun. 27, 2025, for application No. CN202180004401.2 with English translation attached.

*Primary Examiner* — David Y Chung
(74) *Attorney, Agent, or Firm* — Nath, Goldberg & Meyer; Joshua B. Goldberg

(57) ABSTRACT

A light-adjusting glass is provided to include: a first toughened glass layer, a first adhesive layer, a first substrate, a second substrate, a second adhesive layer, a second toughened glass layer and supporting spacers between the first and second substrates, which are sequentially stacked; materials of the first and second adhesive layers are melted under the conditions that a temperature is in a range of 130° C. to 150° C. and a pressure is in a range of 12 bar to 14 bar, and are solidified after being cooled; the light-adjusting glass further includes an edge sealing structure around the first and (Continued)

A–A second substrates, and the edge sealing structure, the first
and second substrates are enclosed to form a gap filled with
a liquid crystal; the edge sealing structure includes a liquid
crystal pouring port therein; a sealing glue is at an opening
of the liquid crystal pouring port and seals the opening.

18 Claims, 10 Drawing Sheets

(51) Int. Cl.
G02F 1/1337        (2006.01)
G02F 1/1339        (2006.01)
G02F 1/1343        (2006.01)

(52) U.S. Cl.
CPC ...... G02F 1/1339 (2013.01); G02F 1/134309
(2013.01); G02F 2202/28 (2013.01)

(56) References Cited

FOREIGN PATENT DOCUMENTS

| | | | |
|---|---|---|---|
| CN | 104330923 | A | 2/2015 |
| CN | 106681041 | A | 5/2017 |
| CN | 109799634 | A | 5/2019 |
| CN | 109823006 | A | 5/2019 |
| CN | 110320697 | A | 10/2019 |
| CN | 111409330 | A | 7/2020 |
| CN | 111624800 | A | 9/2020 |
| CN | 211554553 | U | 9/2020 |
| CN | 214122621 | U | 9/2021 |
| JP | 2016161862 | A | 9/2016 |
| JP | 2021196421 | A | 12/2021 |
| WO | WO-2019240136 | A1 * | 12/2019 ............... G09F 9/30 |

* cited by examiner

E—E

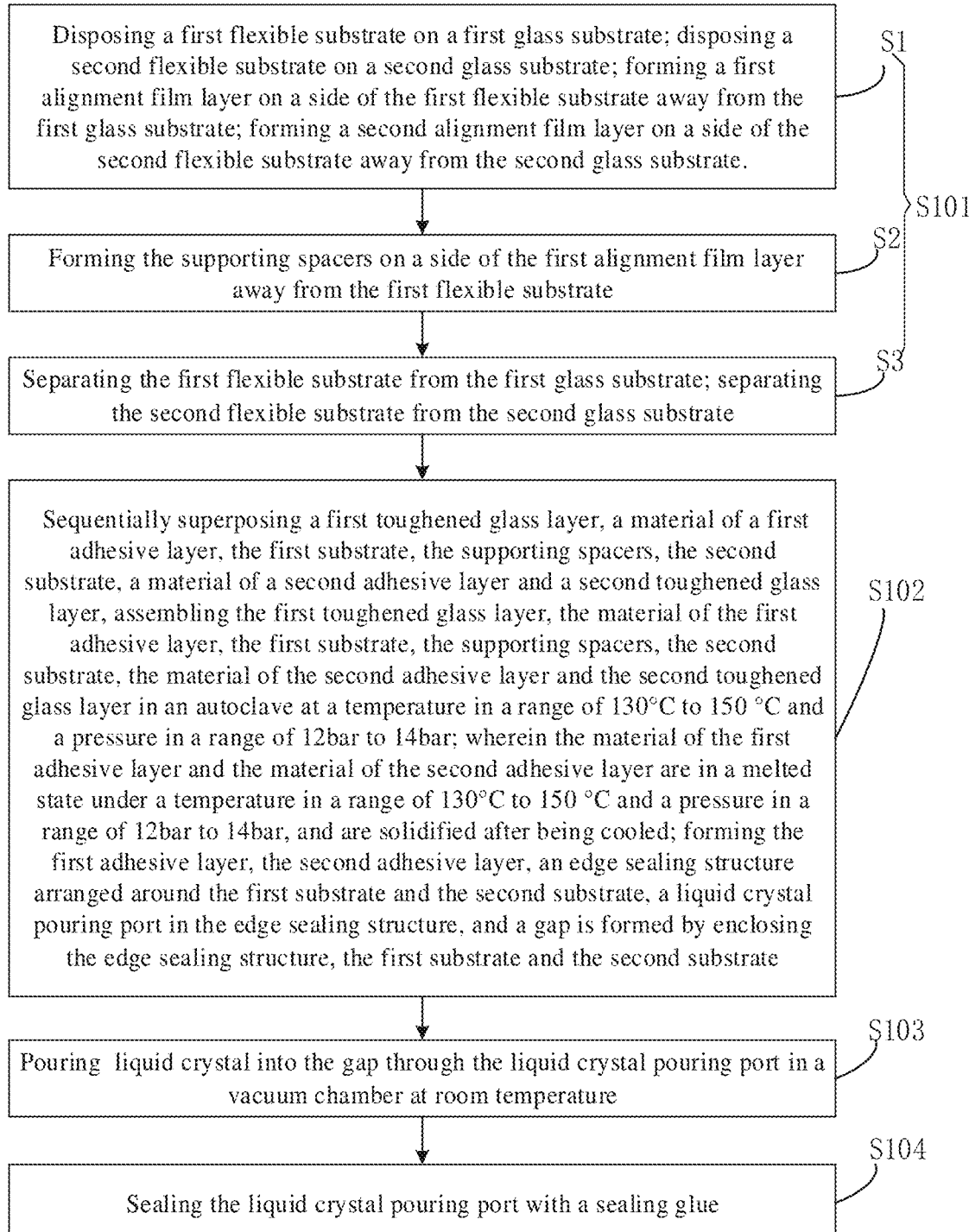

Disposing a first flexible substrate on a first glass substrate; disposing a second flexible substrate on a second glass substrate; forming a first alignment film layer on a side of the first flexible substrate away from the first glass substrate; forming a second alignment film layer on a side of the second flexible substrate away from the second glass substrate.    S1

Forming the supporting spacers on a side of the first alignment film layer away from the first flexible substrate    S2

S101

Separating the first flexible substrate from the first glass substrate; separating the second flexible substrate from the second glass substrate    S3

Sequentially superposing a first toughened glass layer, a material of a first adhesive layer, the first substrate, the supporting spacers, the second substrate, a material of a second adhesive layer and a second toughened glass layer, assembling the first toughened glass layer, the material of the first adhesive layer, the first substrate, the supporting spacers, the second substrate, the material of the second adhesive layer and the second toughened glass layer in an autoclave at a temperature in a range of 130°C to 150 °C and a pressure in a range of 12bar to 14bar; wherein the material of the first adhesive layer and the material of the second adhesive layer are in a melted state under a temperature in a range of 130°C to 150 °C and a pressure in a range of 12bar to 14bar, and are solidified after being cooled; forming the first adhesive layer, the second adhesive layer, an edge sealing structure arranged around the first substrate and the second substrate, a liquid crystal pouring port in the edge sealing structure, and a gap is formed by enclosing the edge sealing structure, the first substrate and the second substrate    S102

Pouring  liquid crystal into the gap through the liquid crystal pouring port in a vacuum chamber at room temperature    S103

Sealing the liquid crystal pouring port with a sealing glue    S104

FIG. 12

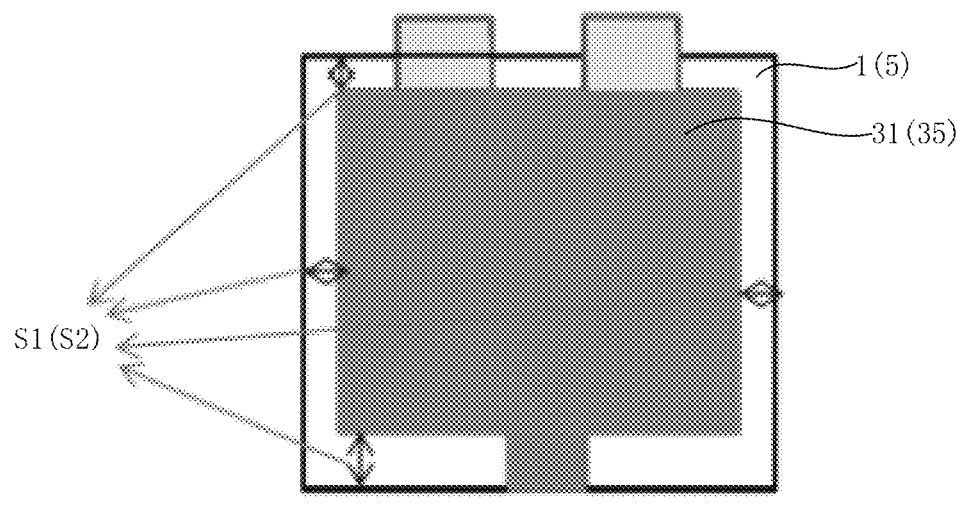
15
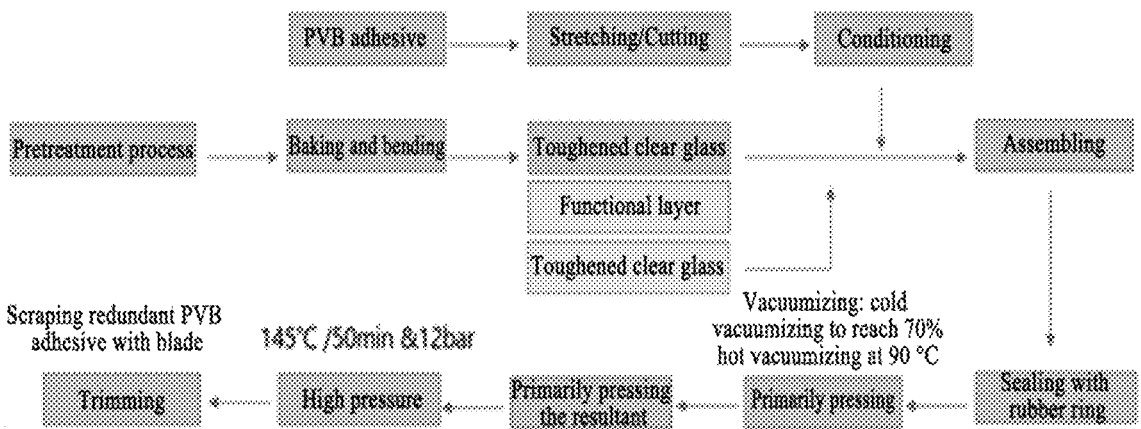
FIG. 16
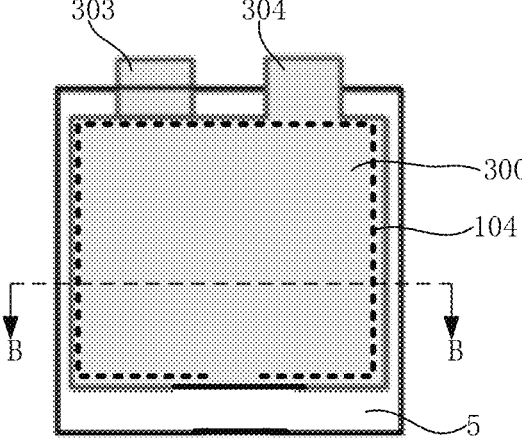
FIG. 17

B–B

Pouring liquid crystal                    Sealing liquid crystal

LIGHT-ADJUSTING GLASS, MANUFACTURING METHOD THEREOF AND VEHICLE

This is a National Phase Application filed under 35 U.S.C. 371 as a national stage of PCT/CN2021/143750, filed Dec. 31, 2021, the content of which is hereby incorporated by reference in its entirety.

TECHNICAL FIELD

The present disclosure relates to the technical field of a light-adjusting glass, and in particular to a light-adjusting glass, a method for manufacturing a light-adjusting glass and a vehicle.

BACKGROUND

A vehicle window used on the vehicle is required to be double-curve, light in weight and thin in thickness, to be beneficial to energy conservation, to be safe and not fragile. At present, the vehicle window of the vehicle mainly includes a common glass-based vehicle window with non-adjustable transmittance.

SUMMARY

The embodiments of the present disclosure provide a light-adjusting glass, a manufacturing method thereof and a vehicle.

In a first aspect, the embodiments of the present disclosure provide a light-adjusting glass, including: a first toughened glass layer, a first adhesive layer, a first substrate, a second substrate, a second adhesive layer, a second toughened glass layer and supporting spacers between the first substrate and the second substrate, which are sequentially stacked; wherein materials of the first adhesive layer and the second adhesive layer are in a melted state under the conditions that a temperature is in a range of 130° C. to 150° C. and a pressure is in a range of 12 bar to 14 bar, and are solidified after being cooled; the light-adjusting glass further includes an edge sealing structure; the edge sealing structure is around the first substrate and the second substrate, and the edge sealing structure, the first substrate and the second substrate are enclosed to form a gap; the gap is filled with a liquid crystal; and the edge sealing structure includes a liquid crystal pouring port therein; a sealing glue is at a position of an opening of the liquid crystal pouring port, and the sealing glue seals the opening.

In some embodiments, the edge sealing structure and the first adhesive layer and/or the second adhesive layer have a one-piece structure; and the edge sealing structure includes an enclosing part, the enclosing part is in contact with end faces at peripheral edges of the first substrate and the second substrate, and an orthographic projection of the enclosing part on the first toughened glass layer does not overlap with orthographic projections of the first substrate and the second substrate on the first toughened glass layer.

In some embodiments, the edge sealing structure further includes a clamping part, the clamping part is around a periphery of the gap and is connected to the enclosing part; and an orthographic projection of the clamping part on the first toughened glass layer overlaps with an orthographic projection of the peripheral edges of the first substrate and the second substrate on the first toughened glass layer.

In some embodiments, the edge sealing structure is between the first substrate and the second substrate; and an orthographic projection of the edge sealing structure on the first toughened glass layer overlaps with an orthographic projection of the peripheral edges of the first substrate and the second substrate on the first toughened glass layer.

In some embodiments, the edge sealing structure is made of the same material as the first adhesive layer and the second adhesive layer; and the material includes polyvinyl butyral or ethylene-vinyl acetate copolymer.

In some embodiments, the first substrate includes a first flexible substrate and a first alignment layer stacked sequentially in a direction away from the first adhesive layer; the second substrate includes a second alignment layer and a second flexible substrate stacked sequentially in the direction close to the second adhesive layer; the first flexible substrate includes a first flexible base and a first electrode layer; the first electrode layer is on a side of the first flexible base close to the first alignment layer; the second flexible substrate includes a second flexible base and a second electrode layer; the second electrode layer is on a side of the second flexible base close to the second alignment layer; and the supporting spacers are between the first alignment layer and the second alignment layer.

In some embodiments, the first flexible base and the second flexible base extend to a region corresponding to the liquid crystal pouring ports, respectively.

In some embodiments, the supporting spacers are further distributed in the region corresponding to the liquid crystal pouring port between the first flexible base and the second flexible base.

In some embodiments, at least one of the first electrode layer, the second electrode layer, the first alignment layer, and the second alignment layer extends to the region corresponding to the liquid crystal pouring port.

In some embodiments, a curvature radius of the first flexible substrate curved along a first direction is greater than 1800 mm; a curvature radius of the first flexible substrate curved along a second direction is greater than 2000 mm; a curvature radius of the second flexible substrate curved along the first direction is greater than 1800 mm; a curvature radius of the second flexible substrate curved along the second direction is greater than 2000 mm; and the first direction and the second direction are perpendicularly crossed with each other to form a rectangular plane coordinate system.

In some embodiments, a transmittance of the first flexible substrate is greater than 80%; and a transmittance of the second flexible substrate is greater than 80%.

In some embodiments, a thermal shrinkage rate of the first flexible substrate along a first direction is less than 0.03%; a thermal shrinkage rate of the first flexible substrate along a second direction is less than 0.03%; a thermal shrinkage rate of the second flexible substrate along the first direction is less than 0.03%; and a thermal shrinkage rate of the second flexible substrate along the second direction is less than 0.03%.

In some embodiments, the first flexible substrate has a thickness in a range of 40 µm to 200 µm; and the second flexible substrate has a thickness in a range of 40 µm to 200 µm.

In some embodiments, the first flexible substrate has a thickness in a range of 170 µm to 200 µm; and the second flexible substrate has a thickness in a range of 170 µm to 200 µm.

In some embodiments, the first electrode layer covers the whole surface of the first flexible base; the second electrode layer covers the whole surface of the second flexible base; or the first electrode layer is divided into at least two first sub-regions, and two adjacent first sub-regions are spaced from each other; the second electrode layer is divided into at least two second sub-regions, and two adjacent second sub-regions are spaced from each other; the at least two first sub-regions and the at least two second sub-regions are in a one-to-one correspondence with each other and ortho-graphic projections of the first sub-region and the second sub-region corresponding to each other on the first flexible base coincide with each other.

In some embodiments, a sheet resistance of the first electrode layer is in a range of 20Ω/□ to 200Ω/□; and a sheet resistance of the second electrode layer is in a range of 20Ω/□ to 200 Ω/□.

In some embodiments, the liquid crystal includes dye liquid crystal; and a tolerable temperature of the dye liquid crystal is in a range of −40° C. to 150° C.

In some embodiments, a curing temperature of an align-ment liquid used for the first alignment layer is in a range of 80° C. to 150° C.; and a curing temperature of an alignment liquid used for the second alignment layer is in a range of 80° C. to 150° C.

In some embodiments, the supporting spacers are spheri-cal particles; each supporting spacer includes a spherical body and an outer cladding layer, and the outer cladding layer is wrapped on a surface of the spherical body; and a color of the outer cladding layer includes black.

In some embodiments, a curing temperature of a material of the supporting spacers is in a range of 90° C. to 120° C.

In a second aspect, the embodiments of the present disclosure further provide a vehicle, wherein the vehicle includes the above light-adjusting glass, and the light-adjusting glass is used as a window of the vehicle.

In a third aspect, embodiments of the present disclosure further provide a method for manufacturing a light-adjusting glass, where the method includes: forming a first substrate and a second substrate and supporting spacers between the first substrate and the second substrate, respectively; sequen-tially superposing a first toughened glass layer, a material of a first adhesive layer, the first substrate, the supporting spacers, the second substrate, a material of a second adhe-sive layer and a second toughened glass layer, laminating the first toughened glass layer, the material of the first adhesive layer, the first substrate, the supporting spacers, the second substrate, the material of the second adhesive layer and the second toughened glass layer in an autoclave at a tempera-ture in a range of 130° C. to 150° C. and a pressure in a range of 12 bar to 14 bar; wherein the material of the first adhesive layer and the material of the second adhesive layer are in a melted state under the condition that the temperature is in a range of 130° C. to 150° C. and the pressure is in a range of 12 bar to 14 bar, and are solidified after being cooled; forming the first adhesive layer, the second adhesive layer, an edge sealing structure arranged around the first substrate and the second substrate, a liquid crystal pouring port in the edge sealing structure, and a gap formed by enclosing the edge sealing structure, the first substrate and the second substrate; pouring the gap with a liquid crystal through the liquid crystal pouring port in a vacuum chamber at room temperature; and sealing the liquid crystal pouring port by a sealing glue.

In some embodiments, the sequentially superposing the first toughened glass layer, the first adhesive layer, the first substrate, the supporting spacers, the second substrate, the second adhesive layer and the second toughened glass layer, laminating the first toughened glass layer, the first adhesive layer, the first substrate, the supporting spacers, the second substrate, the second adhesive layer and the second toughened glass layer in the autoclave at the temperature in a range of 130° C. to 150° C. and the pressure in a range of 12 bar to 14 bar; forming the edge sealing structure arranged around the first substrate and the second substrate, the liquid crystal pouring port in the edge sealing structure, and the gap formed by enclosing the edge sealing structure, the first substrate and the second substrate, further includes: before laminating, providing an adhesive strip between the first substrate and the second substrate; wherein the adhesive strip is correspondingly distributed at the peripheral edges of the first substrate and the second substrate; and the adhesive strip is broken at a corresponding position where the liquid crystal pouring port is formed.

In some embodiments, the adhesive strip is made of the same material as the first adhesive layer and the second adhesive layer; and the material includes polyvinyl butyral or ethylene-vinyl acetate copolymer.

In some embodiments, the sealing the liquid crystal pouring port by using a sealing glue, includes: coating curing glue on a position of the opening of the liquid crystal pouring port; and curing the curing glue by light irradiation.

In some embodiments, the curing glue includes an ultra-violet curing glue.

In some embodiments, the forming the first substrate and the second substrate, respectively, includes: disposing a first flexible substrate on a first glass substrate; disposing a second flexible substrate on a second glass substrate; form-ing a first alignment layer on a side of the first flexible substrate away from the first glass substrate; forming a second alignment layer on a side of the second flexible substrate away from the second glass substrate; forming the supporting spacers on a side of the first alignment layer away from the first flexible substrate; and separating the first flexible substrate from the first glass substrate; separating the second flexible substrate from the second glass substrate.

In some embodiments, the sequentially superposing the first toughened glass layer, the first adhesive layer, the first substrate, the supporting spacers, the second substrate, the second adhesive layer and the second toughened glass layer, laminating the first toughened glass layer, the first adhesive layer, the first substrate, the supporting spacers, the second substrate, the second adhesive layer and the second tough-ened glass layer in the autoclave at the temperature in a range of 130° C. to 150° C. and the pressure in a range of 12 bar to 14 bar; forming the edge sealing structure arranged around the first substrate and the second substrate, the liquid crystal pouring port in the edge sealing structure, and the gap formed by enclosing the edge sealing structure, the first substrate and the second substrate, includes: setting a dis-tance between orthographic projections of corresponding edges of the first flexible substrate and the first toughened glass layer, which are superposed, on the first toughened glass layer to be in a range of 3 mm to 5 mm; setting a distance between orthographic projections of corresponding edges of the second flexible substrate and the second tough-ened glass layer, which are superposed, on the second toughened glass layer to be in a range of 3 mm to 5 mm; placing the superposed layer structure into a vacuum bag and vacuumizing the vacuum bag; and putting the super-posed layer structure packaged with the vacuum bag into the autoclave for assembling; wherein process parameters of assembling in the autoclave are as follows: a temperature rise speed of 5° C./min; a temperature rise time in a range of 20 min to 25 min; a pressurizing speed of 0.7 bar/min; a holding temperature in a range of 130° C. to 150° C. and a pressure in a range of 12 bar to 14 bar for more than 10 min; a cooling time of 30 min; a pressure relief temperature of less than 50° C.

In some embodiments, the pouring the gap with a liquid crystal through the liquid crystal pouring port in a vacuum chamber at room temperature, includes: vacuumizing the vacuum chamber to below 1 pa; and placing the laminated superposed layer structure on a liquid crystal groove containing the liquid crystal, so that the liquid crystal pouring port of the superposed layer structure extends into the liquid crystal in the liquid crystal groove; wherein the liquid crystal pouring port is a capillary tube so that the liquid crystal is poured into the gap under the vacuum capillary siphon action.

In some embodiments, the first flexible substrate includes a first flexible base and a first electrode layer formed on the first flexible base; the second flexible substrate includes a second flexible base and a second electrode layer formed on the second flexible base; the first electrode layer further extends to the outside of the edge sealing structure and forms a first bonding electrode; the second electrode layer further extends to the outside of the edge sealing structure and forms a second bonding electrode; and the manufacturing method further includes: bonding and connecting the first bonding electrode and the second bonding electrode to a driving circuit, respectively, so that the driving circuit provides driving signals to the first bonding electrode and the second bonding electrode.

In some embodiments, the driving circuit is bonded and connected to the first bonding electrode and the second bonding electrode, respectively, by using a conductive adhesive film with an anisotropic property; wherein a diameter of each conductive particle in the conductive adhesive film with the anisotropic property is more than $10 \mu m$; a thickness of the conductive adhesive film with the anisotropic property is more than $20 \mu m$; a temperature in the bonding connection is in a range of 200° C. to 320° C.; a pressure in the bonding connection is in a range of 2 Kgf to 5 Kgf; a duration in the bonding connection is in a range of 10 s to 20 s.

In some embodiments, the method further includes: printing ink on the peripheral frame region of the light-adjusting glass; wherein a width of the frame region where the ink is printed is in a range of 5 mm to 15 mm.

BRIEF DESCRIPTION OF DRAWINGS

The accompanying drawings, which are provided for further understanding of embodiments of the present disclosure and constitute a part of this specification, are for explaining the present disclosure together with the embodiments of the present disclosure, but are not intended to limit the present disclosure. The above and other features and advantages will become more apparent to ordinary skill in the art by describing in detail exemplary embodiments thereof with reference to the drawings. In the drawings:

FIG. 12 is a flowchart of a method for manufacturing a light-adjusting glass according to embodiments of the present disclosure.

FIG. 15 is a schematic diagram of a distance between orthographic projections of corresponding edges of a flexible substrate and a toughened glass layer.

FIG. 16 is a schematic diagram of a specific process flow of a laminating process.

FIG. 17 is a top view of a structure of sequentially stacked layers of a light-adjusting glass used for forming a structure in FIGS. 7 to 9 prior to laminating.

Figure 1:
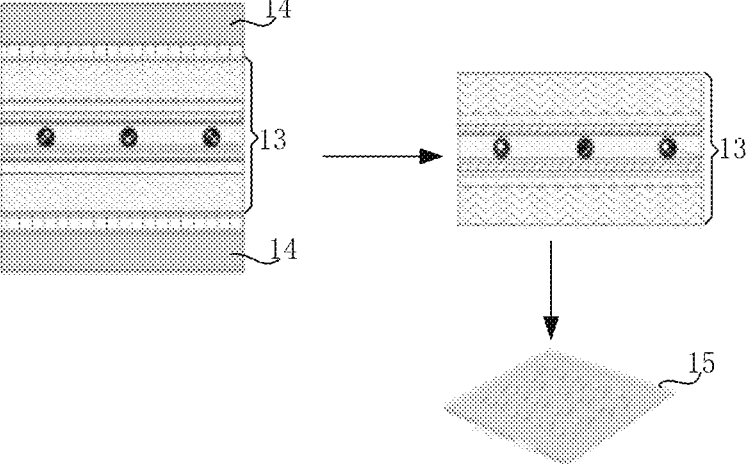
FIG. 1 is a schematic diagram of a process for manufacturing a flexible liquid crystal light-adjusting glass in the prior art.

Reference numbers are:

1. a first toughened glass layer; 2. a first adhesive layer; 200. a first substrate; 3. a light-adjusting structure; 300. a second substrate; 31. a first flexible substrate; 311. a first flexible base; 312. a first electrode layer; 301. a first sub-region; 303. a first bonding electrode; 32. a first alignment layer; 33. a supporting spacer; 34. a second alignment layer; 35. a second flexible substrate; 351. a second flexible base; 352. a second electrode layer; 302. a second sub-region; 304. a second bonding electrode; 4. a second adhesive layer; 5. a second toughened glass layer; 6. a liquid crystal; 7. a first glass substrate; 8. a second glass substrate; 9. a liquid crystal groove; 10. a liquid crystal pouring port; 101. an edge sealing structure; 1011. an enclosing part; 1012. a clamping part; 102. a sealing glue; 103. an opening; 104. an adhesive strip; 11. a driving circuit; 12. ink; 13. a flexible liquid crystal light-adjusting layer; 14. a glass carrier plate; 15. a toughened glass; 16. an adhesive film.

DETAIL DESCRIPTION OF EMBODIMENTS

In order to enable one of ordinary skill in the art to better understand the technical solutions of the embodiments of the present disclosure, a light-adjusting glass, a method for manufacturing a light-adjusting glass and a vehicle provided by the embodiments of the present disclosure will be described in further detail with reference to the accompanying drawings and the detailed description.

The embodiments of the present disclosure will be described more fully hereinafter with reference to the accompanying drawings, but the embodiments shown may be embodied in different forms and should not be construed as limited to the embodiments set forth herein. Rather, these embodiments are provided so that this disclosure will be thorough and complete, and will fully convey the scope of the present disclosure to one ordinary skill in the art.

The disclosed embodiments are not limited to the embodiments shown in the drawings, but include modifications of configurations formed based on a manufacturing process. Thus, areas illustrated in the drawings have schematic properties, and shapes of the areas shown in the drawings illustrate specific shapes of the areas, but are not intended to be limiting.

At present, a small number of vehicle windows adopts a light-adjusting glass, and the current light-adjusting glass mainly includes a flexible PDLC (Polymer Dispersed Liquid Crystal) light-adjusting glass, a flexible EPD (E-Paper display (an electrophoretic display technology)) light-adjusting glass, a flexible ECD (Electron Capture Detector (an electrochromic device)) light-adjusting glass and a rigid liquid crystal light-adjusting glass. The PDLC light-adjusting glass is commonly applied to the field of buildings on the market, and can realize switching between transparency and milky white; however, due to the liquid crystal property of the PDLC light-adjusting glass, the milky color is difficult to match with the vehicle, such as a color of a vehicle body of the vehicle, and the PDLC light-adjusting glass has a haze of more than 10 when shading, so that the PDLC light-adjusting glass has very limited application in the vehicle field. The flexible EPD light-adjusting glass is difficult to meet the requirements of vehicle safety standards due to the fact that the haze of ink particles is large; the flexible ECD light-adjusting glass is limited by the slow response speed of an EC (electrochromism) material, and the flexible ECD light-adjusting glass is difficult to be applied to the vehicle due to the characteristic of a response in an order of seconds; although the color, the response speed and the haze of the rigid liquid crystal light-adjusting glass are all relatively in accordance with the requirements of vehicles, a rigid glass base of the rigid liquid crystal light-adjusting glass is fragile, so that the rigid liquid crystal light-adjusting glass is difficult to meet the standards of vehicle window fragments in the field of vehicles and is difficult to be well applied in consideration of personal safety; in addition, since a liquid crystal light-adjusting layer in the rigid liquid crystal light-adjusting glass has a rigid structure, the rigid structure cannot be well adapted to the single-curved (i.e. bent in one direction) or double-curve spherical (i.e. bent in two opposite directions) shape which is pre-shaped by an outer toughened glass, so that the rigid liquid crystal light-adjusting glass is difficult to meet the requirements on double-curve spherification.

In addition, a flexible liquid crystal light-adjusting glass is also available in the market at present. FIG. 1 is a schematic diagram of a process for manufacturing a flexible liquid crystal light-adjusting glass in the prior art. Referring to FIG. 1, the procedure for manufacturing the flexible liquid crystal light-adjusting glass includes: firstly, forming a flexible liquid crystal light-adjusting layer 13. For example, the flexible liquid crystal light-adjusting layer 13 is firstly formed on a glass carrier plate 14; and then the flexible liquid crystal light-adjusting layer 13 is separated from the glass carrier plate 14; subsequently, high-temperature and high-pressure laminating is performed on the whole flexible liquid crystal light-adjusting layer 13 and the toughened glass 15 through a transparent adhesive layer, thereby forming the flexible liquid crystal light-adjusting glass protected by the toughened glass 15 and located on two opposite outer side surfaces of the flexible liquid crystal light-adjusting layer 13; however, under the influence of high temperature and high pressure in the laminating process, liquid crystal in the flexible liquid crystal light-adjusting layer 13 is easy to generate bubbles to cause poor products, so that the light-adjusting glass is scrapped; after the laminating, a sample cannot be subjected to screen cutting analysis, i.e. when the sample after the laminating is poor, the sample is cut for defect analysis, and it is difficult to determine the cause of the poor analysis; it is difficult to improve the yield, and it is difficult to improve the product performance.

Figure 2:
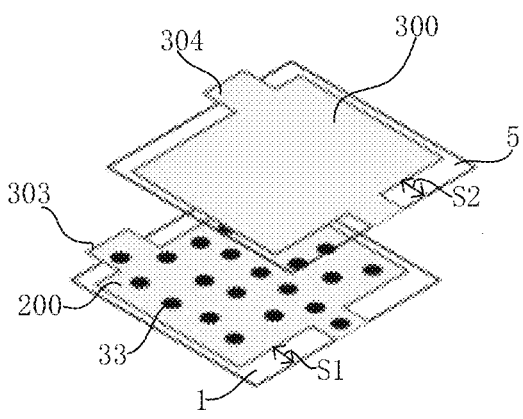
FIG. 2 is an exploded view of a structure of a light-adjusting glass according to embodiments of the present disclosure.
Figure 3:
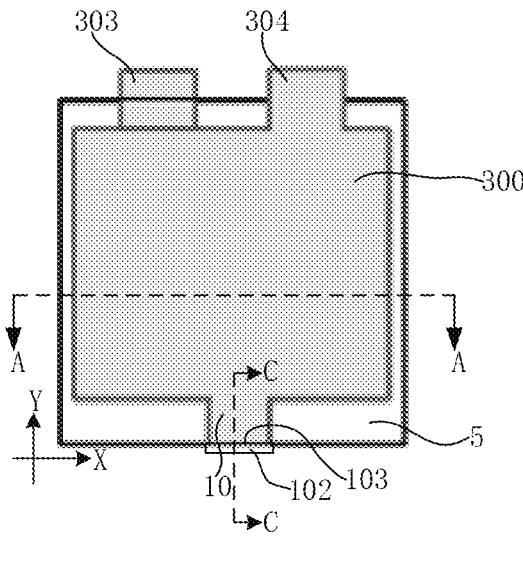
FIG. 3 is a top view of a structure of a light-adjusting glass according to embodiments of the present disclosure.
Figure 4:
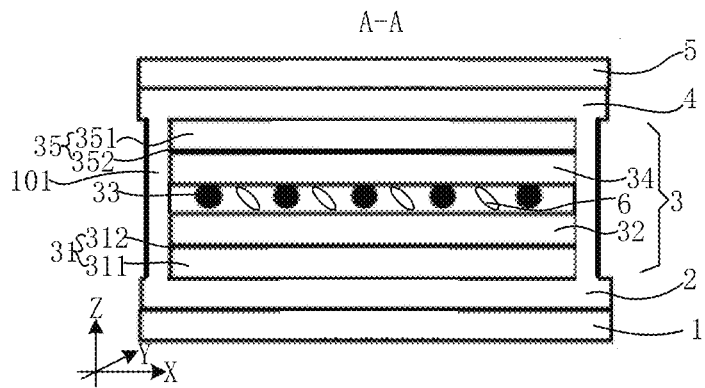
FIG. 4 is a cross-sectional view of a structure of a light-adjusting glass along a section line AA in FIG. 3 according to embodiments of the present disclosure.

Referring to FIGS. 2 to 4, FIG. 2 is an exploded view of a structure of a light-adjusting glass according to an embodiment of the present disclosure. FIG. 3 is a top view of a structure of a light-adjusting glass according to an embodiment of the present disclosure. FIG. 4 is a cross-sectional view of a structure of a light-adjusting glass along a section line AA in FIG. 3 according to an embodiment of the present disclosure. For the above problem of the light-adjusting glass used for the current vehicle, the embodiment of the present disclosure provides a light-adjusting glass, including: a first toughened glass layer 1, a first adhesive layer 2, a first substrate 200, a second substrate 300, a second adhesive layer 4, a second toughened glass layer 5 and supporting spacers 33 arranged between the first substrate 200 and the second substrate 300, which are sequentially stacked; materials of the first adhesive layer 2 and the second adhesive layer 4 are in a melted state under the conditions that a temperature is in a range of 130° C. to 150° C. and a pressure is in a range of 12 bar to 14 bar, and are solidified after being cooled; the light-adjusting glass further includes an edge sealing structure 101; the edge sealing structure 101 is arranged around the first substrate 200 and the second substrate 300, and the edge sealing structure 101, the first substrate 200 and the second substrate 300 are enclosed to form a gap; the gap is filled with a liquid crystal 6; the edge sealing structure 101 is provided with a liquid crystal pouring port 10 therein; a sealing glue 102 is disposed at a position of an opening 103 of the liquid crystal pouring port 10, and the sealing glue 102 seals the opening 103.

The liquid crystal pouring port 10 is a capillary tube filled with a liquid crystal, and the opening 103 of the capillary tube is sealed by the sealing glue 102. The sealing glue 102 may be a light curing glue, such as an ultraviolet curing glue. It should be noted that the sealing glue 102 cannot adopt the same material as the first adhesive layer 2 and the second adhesive layer 4, because in the present disclosure, the first substrate 200, the second substrate 300 and the toughened glass layers are firstly laminated through the first adhesive layer 2 and the second adhesive layer 4, then the liquid crystal 6 is poured, and finally the opening 103 of the liquid crystal pouring opening 10 is sealed, so that a sealing process of the sealing glue cannot damage or affect the laminated structure. Therefore, the sealing glue is usually a light curing compound or the like, with a curing temperature not close to or exceeding a laminating temperature.

In some embodiments, referring to FIG. 4, the edge sealing structure 101 and the first adhesive layer 2 and/or the second adhesive layer 4 have a one-piece structure; the edge sealing structure 101 includes an enclosing part 1011, the enclosing part 1011 is in contact with end faces at peripheral edges of the first substrate 200 and the second substrate 300, and an orthographic projection of the enclosing part 1011 on the first toughened glass layer 1 does not overlap with orthographic projections of the first substrate 200 and the second substrate 300 on the first toughened glass layer 1. The end faces at peripheral edges of the first substrate 200 and the second substrate 300 except for the opening 103 of the liquid crystal pouring port 10 are encapsulated and sealed by the enclosing part 1011 of the edge sealing structure 101.

Figure 5:
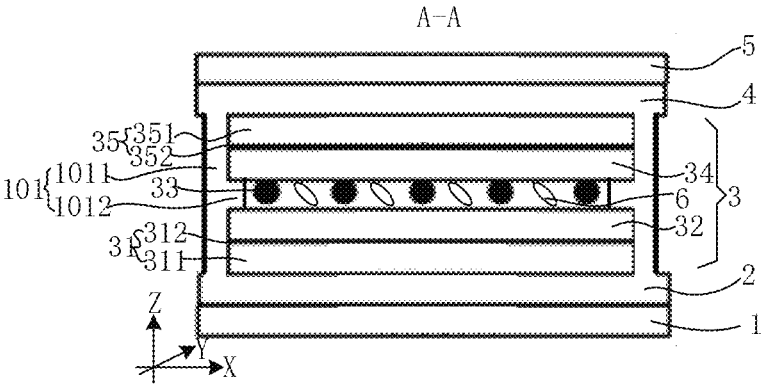
FIG. 5 is a cross-sectional view of another structure of a light-adjusting glass along a section line AA in FIG. 3 according to embodiments of the present disclosure.

In some embodiments, referring to FIG. 5, FIG. 5 is a cross-sectional view of another structure of a light-adjusting glass along a section line AA in FIG. 3 according to an embodiment of the present disclosure. The edge sealing structure 101 further includes a clamping part 1012, wherein the clamping part 1012 is around a periphery of the gap and is connected to the enclosing part 1011; an orthographic projection of the clamping part 1012 on the first toughened glass layer 1 overlaps with an orthographic projection of the peripheral edges of the first substrate 200 and the second substrate 300 on the first toughened glass layer 1. The edge sealing structure 101 further extends to a space between the first substrate 200 and the second substrate 300, so that the edge sealing structure 101 further seals a periphery of the first substrate 200 and the second substrate 300.

In some embodiments, the first substrate 200 includes a first flexible substrate 31 and a first alignment layer 32 stacked sequentially in a direction Z away from the first adhesive layer 2; the second substrate 300 includes a second alignment layer 34 and a second flexible substrate 35 stacked sequentially in the direction Z close to the second adhesive layer 4; the first flexible substrate 31 includes a first flexible base 311 and a first electrode layer 312; the first electrode layer 312 is located on a side of the first flexible base 311 close to the first alignment layer 32; the second flexible substrate 35 includes a second flexible base 351 and a second electrode layer 352; the second electrode layer 352 is located on a side of the second flexible base 351 close to the second alignment layer 34; the supporting spacers 33 are located at a local position (locally) between the first alignment layer 32 and the second alignment layer 34.

Figure 6:
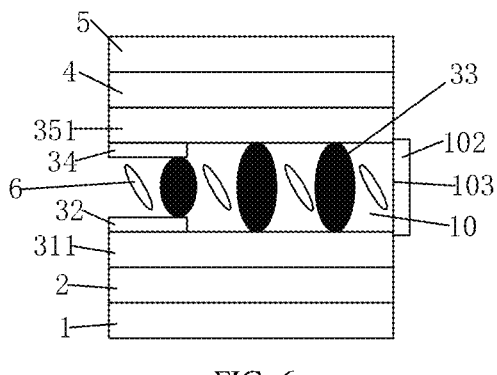
FIG. 6 is a cross-sectional view of a structure of a light-adjusting glass along a section line CC in FIG. 3 according to embodiments of the present disclosure.

In some embodiments, referring to FIGS. 3 and 6, the first flexible base 311 and the second flexible base 351 extend to a region corresponding to the liquid crystal pouring port 10, respectively. Referring to FIG. 6, the first flexible base 311 and the second flexible base 351 extend into the liquid crystal pouring port 10, respectively, and serve as upper and lower sidewalls of the liquid crystal pouring port 10, respectively.

Figure 7:
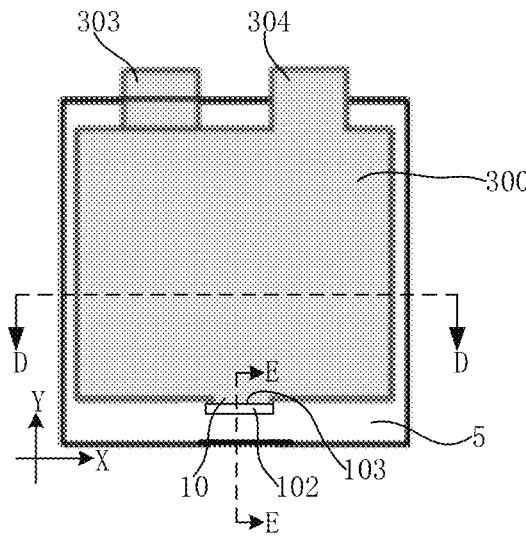
FIG. 7 is a top view of another structure of a light-adjusting glass according to embodiments of the present disclosure.
Figure 8:
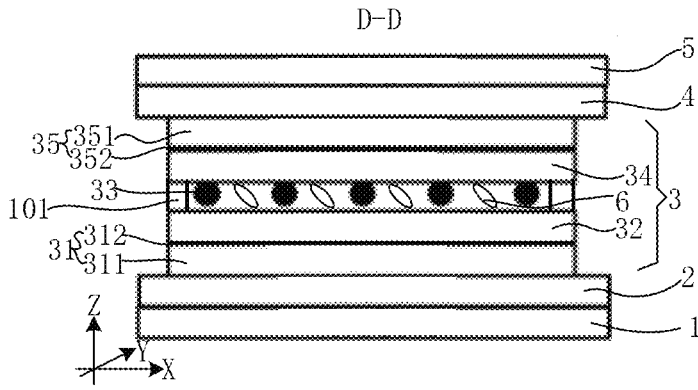
FIG. 8 is a cross-sectional view of a structure of a light-adjusting glass along a section line DD in FIG. 7 according to embodiments of the present disclosure.

In some embodiments, referring to FIGS. 7 and 8, FIG. 7 is a top view of another structure of a light-adjusting glass according to an embodiment of the present disclosure. FIG. 8 is a cross-sectional view of a structure of a light-adjusting glass along a section line DD in FIG. 7 according to an embodiment of the present disclosure. The edge sealing structure 101 is located between the first substrate 200 and the second substrate 300; an orthographic projection of the edge sealing structure 101 on the first toughened glass layer 1 overlaps with the orthographic projection of the peripheral edges of the first substrate 200 and the second substrate 300 on the first toughened glass layer 1. The edge sealing structure 101 is located at a position between the first substrate 200 and the second substrate 300 where a frame sealing adhesive is originally disposed. In this way, the edge sealing structure 101 can seal the periphery of the first substrate 200 and the second substrate 300.

In some embodiments, the edge sealing structure 101 is made of the same material as the first adhesive layer 2 and the second adhesive layer 4; the material includes polyvinyl butyral (PVB) or ethylene-vinyl acetate (EVA) copolymer. The edge sealing structure 101 is made of such the material, so that the substrates or the layers of the light-adjusting glass can be integrally laminated conveniently.

Figure 9:
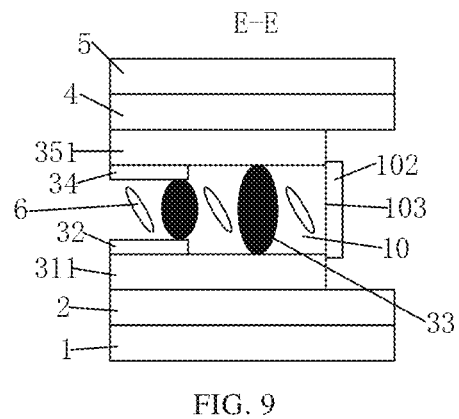
FIG. 9 is a cross-sectional view of a structure of a light-adjusting glass along a section line EE in FIG. 7 according to embodiments of the present disclosure.

In some embodiments, referring to FIGS. 7 and 9, FIG. 9 is a cross-sectional view of a structure of a light-adjusting glass along a section line EE in FIG. 7 according to an embodiment of the present disclosure. The first flexible base 311 and the second flexible base 351 extend to a region corresponding to the liquid crystal injection opening 10, respectively. Referring to FIG. 9, the first flexible base 311 and the second flexible base 351 extend to the region corresponding to the liquid crystal pouring port 10, respectively, and serve as the upper and lower sidewalls of the liquid crystal pouring port 10.

In some embodiments, the supporting spacers 33 are distributed in the region corresponding to the liquid crystal pouring port 10 between the first flexible base 311 and the second flexible base 351. The supporting spacers 33 are formed on the entire surface of the first alignment layer 32, so that the supporting spacers 33 are also distributed in the region of the liquid crystal pouring port 10; the supporting spacers 33 can support portions of the first flexible base 311 and the second flexible base 351, which are upper and lower sidewalls of the liquid crystal pouring port 10, so that a capillary-shaped passage is formed between the upper and lower sidewalls and allows the liquid crystal 6 to pass through.

In some embodiments, at least one of the first electrode layer 312, the second electrode layer 352, the first alignment layer 32, and the second alignment layer 34 extends to the region corresponding to the liquid crystal pouring port 10.

The first electrode layer 312 is formed on the whole surface of the first flexible base 311; the second electrode layer 352 is formed on the entire surface of the second flexible base 351, so that the first electrode layer 312 and the second electrode layer 352 extend to the region of the liquid crystal pouring port 10. The first alignment layer 32 is formed on the whole surface of the first electrode layer 312, and the second alignment layer 34 is formed on the whole surface of the second electrode layer 352, so that the first alignment layer 32 and the second alignment layer 34 respectively extend to the region of the liquid crystal pouring port 10. With such an arrangement, on one hand, the processes for forming the first electrode layer 312, the second electrode layer 352, the first alignment layer 32 and the second alignment layer 34 can be simplified. For example, without cutting or patterning the layers for the second time, portions of the layers at the region corresponding to the liquid crystal pouring port 10 can be formed; on the other hand, it is advantageous to form the capillary-shaped liquid crystal pouring port 10.

In some embodiments, a curvature radius of the first flexible substrate 31 curved along a first direction X is greater than 1800 mm; a curvature radius of the first flexible substrate 31 curved along a second direction Y is greater than 2000 mm; a curvature radius of the second flexible substrate 35 curved along the first direction X is greater than 1800 mm; a curvature radius of the second flexible substrate 35 curved along the second direction Y is greater than 2000 mm; the first direction X and the second direction Y are perpendicularly crossed with each other to form a rectangular plane coordinate system.

The gap between the first substrate 200 and the second substrate 300 is filled with the liquid crystal 6 to form a light-adjusting structure 3. Compared with a rigid glass substrate of a rigid liquid crystal light-adjusting glass in the disclosed technology, in the embodiment of the present disclosure, the first flexible substrate 31 and the second flexible substrate 35 can be flexibly bent, so that on one hand, the light-adjusting structure 3 can be prevented from being fragile, and the safety of the light-adjusting glass can be ensured in the application of the vehicle; on the other hand, the first flexible substrate 31 and the second flexible substrate 35 can be flexibly bent, so that the flexible substrate and the light-adjusting structure 3 can be well adapted to the modeling requirements of single-curve (i.e., bent in one direction) or double-curve spherification (i.e., bent in two opposite directions) preset (i.e., set in advance) on the outer toughened glass layer, and the flexible substrate and the light-adjusting structure are completely matched with and better adapted to the preset shape of the outer toughened glass layer, so that the requirement of the double-curve spherification on the existing light-adjusting glass can be met better and the light-adjusting glass is double-curve (i.e., bent in two opposite directions) and is free of folds, and the requirement of the light-adjusting glass as the glass of the vehicle window is better met.

In some embodiments, a transmittance of the first flexible substrate 31 is greater than 80%; a transmittance of the second flexible substrate 35 is greater than 80%. The first flexible substrate 31 and the second flexible substrate 35 with such the transmittance can ensure the transmittance of the light-adjusting glass. Compared with the PDLC light-adjusting glass and the EPD light-adjusting glass with a larger haze in the disclosed technology, the haze of the light-adjusting glass in the embodiment of the present disclosure is less than 1, so that the standard requirements of vehicle windows can be well met when the light-adjusting glass is applied to the vehicle.

In some embodiments, a thermal shrinkage rate of the first flexible substrate 31 along the first direction X is less than 0.03%; a thermal shrinkage rate of the first flexible substrate 31 along the second direction Y is less than 0.03%; a thermal shrinkage rate of the second flexible substrate 35 along the first direction X is less than 0.03%; a thermal shrinkage rate of the second flexible substrate 35 along the second direction Y is less than 0.03%. The thermal shrinkage rates of the first flexible substrate 31 and the second flexible substrate 35 can well meet a standard requirement of the application of the light-adjusting glass to vehicle windows.

The thermal shrinkage rates of the first flexible substrate 31 and the second flexible substrate 35 are close to the thermal shrinkage rate of the outer toughened glass layer, so that in the high-temperature and high-pressure laminating process, the relative thermal shrinkage amount between the flexible substrate and the outer toughened glass layer (a difference between the thermal shrinkage of the flexible substrate and the outer toughened glass layer) is greatly reduced, and the relative thermal shrinkage change between the flexible substrate and the outer toughened glass layer (a difference between the thermal shrinkage change of the flexible substrate and the outer toughened glass layer) is reduced. That is, the thermal shrinkage changes of the flexible substrate and the outer toughened glass layer are substantially consistent with each other, so that it can be better realized that the light-adjusting glass is double-curve (i.e., bent in two opposite directions) and is free of folds, and the yield of the light-adjusting glass is ensured.

In some embodiments, the first flexible substrate 31 has a thickness in a range of 40 μm to 200 μm; the second flexible substrate 35 has a thickness in a range of 40 μm to 200 μm.

In some embodiments, it is preferred that the thickness of the first flexible substrate 31 is in a range of 170 μm to 200 μm; the thickness of the second flexible substrate 35 is in a range of 170 μm to 200 μm.

The performance of the first flexible substrate 31 and the second flexible substrate 35 with the thickness of more than 170 μm is superior to that for the thickness of less than 170 μm in the laminating process, and Mura (i.e., local blackening phenomenon) of the light-adjusting glass caused by the laminating process is slightly or does not exist as a whole, so that the whole light transmission and appearance performance of the light-adjusting glass applied to the vehicle window are improved.

In some embodiments, a temperature range in which the first adhesive layer 2 melts is from 130° C. to 150° C. (which refers to the degrees centigrade in the present disclosure); a temperature range in which the second adhesive layer 4 melts is from 130° C. to 150° C. Therefore, the first adhesive layer 2 and the second adhesive layer 4 can be fully melted at the laminating temperature of 130° C. to 150° C., so as to form a sealing frame on the periphery of the first substrate 200 and the second substrate 300.

In some embodiments, a tolerable temperature of the first flexible substrate 31 is greater than or equal to 170° C.; a tolerable temperature of the second flexible substrate 35 is greater than or equal to 170° C.

In some embodiments, the tolerable temperature of the first flexible substrate 31 is greater than 150° C.; the tolerable temperature of the second flexible substrate 35 is greater than 150° C.

The tolerable temperatures of the first flexible substrate 31 and the second flexible substrate 35 can ensure that the first flexible substrate 31 and the second flexible substrate 35 are not thermally damaged in the subsequent processes for forming the layers (with a temperature range of 90° C. to 120° C.) and the subsequent laminating process (with a temperature range of 130° C. to 150° C.), and can prevent the first flexible substrate 31 and the first toughened glass layer 1 from being peeled off from each other and prevent the second flexible substrate 35 and the second toughened glass layer 5 from being peeled off from each other.

In some embodiments, a material of each of the first flexible base 311 and the second flexible base 351 includes any one of PET (polyethylene terephthalate), COP (cyclic olefin polymer), CPI (transparent polyimide film), TAC (triacetyl cellulose film). A material of each of the first electrode layer 312 and the second electrode layer 352 includes a transparent conductive material such as ITO (indium tin oxide) or IZO (indium zinc oxide).

In some embodiments, the first electrode layer 312 covers the whole surface of the first flexible base 311; the second electrode layer 352 covers the whole surface of the second flexible base 351. Different voltage signals (such as a voltage signal in a range of 0 to 24V or of 0 to 16V) are respectively applied to the first electrode layer 312 and the second electrode layer 352, so that an electric field capable of rotating the liquid crystal 6 is formed between the first electrode layer 312 and the second electrode layer 352, thereby realizing the function of a whole surface light-adjusting of the light-adjusting glass.

In some embodiments, a sheet resistance of the first electrode layer 312 is in a range of 20Ω/□ to 200Ω/□; a sheet resistance of the second electrode layer 352 is in a range of 20Ω/□ to 200 Ω/□.

Figure 10:
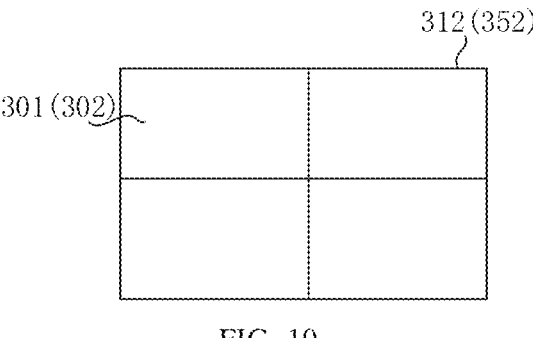
FIG. 10 is a top view of an arrangement of a first electrode layer and a second electrode layer in partitions according to embodiments of the present disclosure.

In some embodiments, referring to FIG. 10, FIG. 10 is a top view of an arrangement of a first electrode layer and a second electrode layer in partitions according to an embodiment of the present disclosure. The first electrode layer 312 is divided into at least two first sub-regions 301, and two adjacent first sub-regions 301 are spaced from each other; the second electrode layer 352 is divided into at least two second sub-regions 302, and two adjacent second sub-regions 302 are spaced from each other; the first sub-regions 301 and the second sub-regions 302 are in a one-to-one correspondence with each other and orthographic projections of the first sub-region 301 and the second sub-region 302 corresponding to each other on the first flexible base 311 coincide with each other.

By respectively partitioning the first electrode layer 312 and the second electrode layer 352, the light-adjusting function of the partitions of the light-adjusting glass can be realized, so that the light-adjusting of the light-adjusting glass is more personalized and intelligent, and further different personalized requirements of vehicle customers can be met.

In some embodiments, the first sub-regions 301 and the second sub-regions 302 may be formed by uniformly partitioning the first electrode layer 312 and the second electrode layer 352, respectively. For example, the adjacent first sub-regions 301 are spaced from each other by a distance of greater than or equal to 40 μm. And the adjacent second sub-regions 302 are spaced from each other by a distance of greater than or equal to 40 μm. For example, the partition may be realized by a laser etching method; a laser wavelength is in a range of 200 nm to 380 nm; the circuits can be subsequently driven by adopting a partition control mode. For example, the light-adjusting glass can selectively perform regional light-adjusting on a partition, and other partitions are kept transparent or black.

Figure 11:
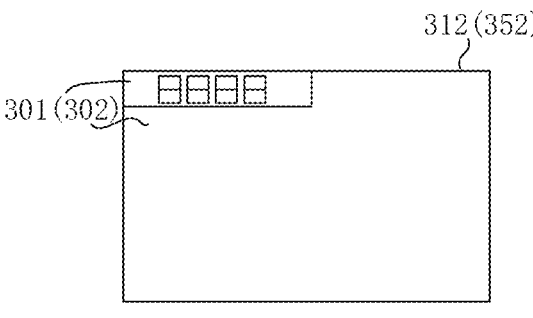
FIG. 11 is a top view of another arrangement of a first electrode layer and a second electrode layer in partitions according to embodiments of the present disclosure.

In some embodiments, referring to FIG. 11, FIG. 11 is a top view of another arrangement of a first electrode layer and a second electrode layer in partitions according to an embodiment of the present disclosure. The first electrode layer 312 and the second electrode layer 352 may be non-uniformly partitioned. For example, on the premise of ensuring that the transmittance of the entire light-adjusting glass is greater than 40% as specified in the national safety standard, a complex patterning is performed on the first electrode layer 312 and the second electrode layer 352, to display simple text, such as information regarding an electric quantity, a temperature, time of the vehicle and the like. The specific scheme is as follows: patterning portions of the first electrode layer 312 and the second electrode layer 352 in a certain corner of the light-adjusting glass into a plurality of first sub-regions 301 and a plurality of second sub-regions 302, respectively; the plurality of first sub-regions 301 and the plurality of second sub-regions 302 are in a one-to-one correspondence with each other and orthographic projections of the first sub-region 301 and the second sub-region 302 corresponding to each other on the first flexible base 311 coincide with each other. Two adjacent first sub-regions 301 are spaced from each other by a distance of more than or equal to 2 μm; and similarly, two adjacent second sub-regions 302 are spaced from each other by a distance of more than or equal to 2 μm. The first electrode layer 312 and the second electrode layer 352 may be patterned and partitioned, for example, by a patterning process (including exposure, development, etching, and the like). For example: seven groups of first sub-regions 301 and seven groups of second sub-regions 302, which are in a one-to-one correspondence with each other, are arranged to form a shape of four Chinese characters "日" arranged side-by-side, and any one sub-region in the Chinese characters "日" may be independently controlled to be lightened in a subsequent circuit driving, so that the four Chinese characters "日" arranged side-by-side dynamically display time information. In a region outside the corner of the light-adjusting glass, the first electrode layer 312 and the second electrode layer 352 are disposed as a whole, respectively, so that the upper and lower electrode layers disposed as a whole serve as the entire light-adjusting region of the light-adjusting glass, thereby realizing different transmittances (i.e., different transparencies) of the light-adjusting glass.

In some embodiments, the light-adjusting structure 3 has a thickness in a range of 0.15 mm to 0.38 mm. Each of the first flexible substrate 31 and the second flexible substrate 35 has a thickness in a range of 40 μm to 180 μm. Each of the first toughened glass layer 1 and the second toughened glass layer 5 has a thickness in a range of 2 mm to 3 mm. Each of the first adhesive layer 2 and the second adhesive layer 4 has a thickness in a range of 0.38 mm to 0.76 mm. The thicknesses of the above layers can ensure that the whole thickness of the light-adjusting glass cannot exceed the whole thickness of the vehicle window to ensure that the light-adjusting glass can be normally installed in the vehicle and be applied to the vehicle.

In some embodiments, the materials of the first adhesive layer 2 and the second adhesive layer 4 include PVB (polyvinyl butyral) or EVA (ethylene vinyl acetate copolymer). An ultraviolet filtering layer or an ultraviolet filtering material, which can filter out ultraviolet rays below 400 nm, may be arranged in the first adhesive layer 2 and the second adhesive layer 4, so that the phenomenon is avoided that the service life of the light-adjusting glass is shortened due to the influence of ultraviolet irradiation on the liquid crystal 6.

In some embodiments, the liquid crystal 6 includes a dye liquid crystal; the dye liquid crystal is used as a liquid crystal display dye. The dye is added into the liquid crystal, enabling a color display through the liquid crystal. The dye liquid crystal has sufficient solubility for the liquid crystal and cannot affect the performance of the liquid crystal. Other components have a good linearity, and may be kept to be arranged parallel to the orientation of liquid crystal molecules after being added into the liquid crystal, and molecules of the components are rotated in a same phase as the liquid crystal molecules under the action of an electric field. The dye liquid crystal must not only be pure, and has a high dichroic ratio (≥10), a high extinction coefficient (≥0.3), a high solubility (≥5%), a high impedance (≥10 ohm·cm), a high stability and a good panchromatic property. The dye liquid crystal may be generally divided into two main categories, that is, azo dyes and anthraquinone derivatives. A tolerable temperature of the dye liquid crystal is in a range of −40° C. to 150° C. The dye liquid crystal may be restored to a normal operating state after operating at a high temperature of more than 100° C. without influencing the reliability; after operating at the temperature of −40° C., the dye liquid crystal has no dye crystal precipitation, may normally operate after the room temperature is recovered, and does not damage the orientation and the optical performance of the light-adjusting structure 3.

In some embodiments, the dye liquid crystal may adopt a gray dye, and the gray dye liquid crystal may form a better visual effect matching with a color of the vehicle such as a vehicle body, which is well liked by a client. Alternatively, the dye liquid crystal may also adopt dyes of other colors, which is not limited herein.

In some embodiments, a curing temperature of the alignment liquid used for the first alignment layer 32 is in a range of 80° C. to 150° C.; a curing temperature of the alignment liquid used for the second alignment layer 34 is in a range of 80° C. to 150° C. The curing temperature range is more beneficial to the volatilization of redundant solvents when forming the alignment layer, thereby ensuring that the film forming characteristic of the alignment layers is better and less in defects.

In some embodiments, the supporting spacers 33 are spherical particles; each supporting spacer 33 includes a spherical body and an outer cladding layer, and the outer cladding layer is wrapped on a surface of the spherical body; a color of the outer cladding layer includes black. The black outer cladding layer can reduce the light transmittance of the light-adjusting structure 3 in a dark state and lower the transmittance in the dark state. The arrangement of the supporting spacers 33 can ensure that uniform and equal gaps are formed between the first alignment layer 32 and the second alignment layer 34, so that the uniform thickness of the liquid crystal layer 6 in the gaps is ensured, and the uniform light transmission effect of the light-adjusting glass is ensured.

In some embodiments, the supporting spacers may also be in a column shape, and the supporting spacers may be in a white or transparent state.

In some embodiments, a curing temperature of the material of the supporting spacers 33 is in a range of 90° C. to 120° C. In this temperature range, the supporting spacers 33 can be firmly adhered to the surfaces of the first alignment layer 32 and the second alignment layer 34, and is not easily moved, thereby ensuring the uniformity of the gap formed between the first alignment layer 32 and the second alignment layer 34.

In addition, the curing temperature of the supporting spacers 33 matches with the tolerable temperatures of the first flexible substrate 31 and the second flexible substrate 35, the curing temperature of the first alignment layer 32 and the second alignment layer 34 and the tolerable temperature of the liquid crystal 6, so that the first flexible substrate 31 and the second flexible substrate 35 are not thermally damaged in the subsequent adhering process of the supporting spacers 33 and the first alignment layer 32 and the second alignment layer 34 and in the subsequent laminating process (with a temperature range of 130° C. to 150° C.), and the first flexible substrate 31 and the first toughened glass layer 1 can be prevented from being peeled off from each other and the second flexible substrate 35 and the second toughened glass layer 5 can be prevented from being peeled off from each other.

It can be realized that the light-adjusting glass provided in the embodiment of the present disclosure is double-curve and not fragile, does not have the problem that fragments threaten personal safety, has a low haze value (less than 1), which can satisfy a vehicle regulation standard, and has a quick response (less than 40 ms), which can satisfy the vehicle window standard requirement. The short response time can satisfy a traffic quick response requirement well, which can make up the technical vacancy of current market demand.

Figures 13, 14:
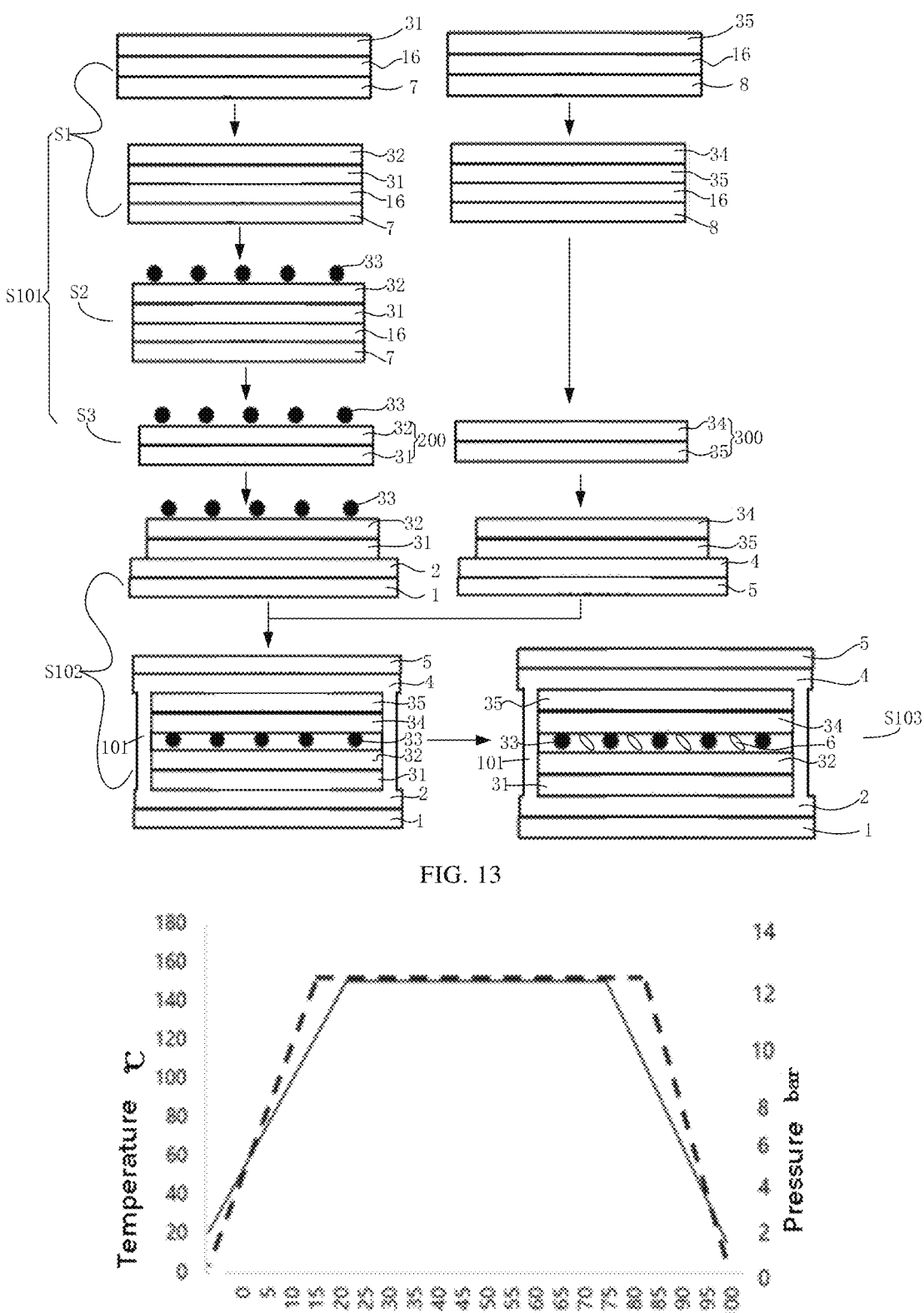
FIG. 13 is a schematic diagram of a structure of a light-adjusting glass in FIG. 4 and FIG. 5 in the manufacturing process according to embodiments of the present disclosure.
FIG. 14 is a temperature-pressure curve for a laminating process according to embodiments of the present disclosure.

Based on the light-adjusting glass with the above structure, an embodiment of the present disclosure further provides a method for manufacturing the light-adjusting glass. Referring to FIGS. 12 to 13, FIG. 12 is a flowchart of a method for manufacturing a light-adjusting glass according to an embodiment of the present disclosure. FIG. 13 is a schematic diagram of a structure of a light-adjusting glass in FIG. 4 and FIG. 5 in the manufacturing process according to an embodiment of the present disclosure, the method includes:

Step S101: forming a first substrate 200 and a second substrate 300, and supporting spacers 33 between the first substrate 200 and the second substrate 300, respectively.

Step S102: sequentially superposing a first toughened glass layer 1, a material of a first adhesive layer 2, the first substrate 200, the supporting spacers 33, the second substrate 300, a material of a second adhesive layer 4 and a second toughened glass layer 5, laminating the first toughened glass layer 1, the material of the first adhesive layer 2, the first substrate 200, the supporting spacers 33, the second substrate 300, the material of the second adhesive layer 4 and the second toughened glass layer 5 in an autoclave at a temperature in a range of 130° C. to 150° C. and a pressure in a range of 12 bar to 14 bar; wherein the material of the first adhesive layer 2 and the material of the second adhesive layer 4 are in a melted state under the condition that the temperature is in a range of 130° C. to 150° C. and the pressure is in a range of 12 bar to 14 bar, and are solidified after being cooled; forming the first adhesive layer 2, the second adhesive layer 4, an edge sealing structure 101 arranged around the first substrate 200 and the second substrate 300, a liquid crystal pouring port 10 in the edge sealing structure 101, and a gap formed by enclosing the edge sealing structure 101, the first substrate 200 and the second substrate 300.

Step S103: pouring the gap with a liquid crystal 6 through the liquid crystal pouring port 10 in a vacuum chamber at room temperature.

Step S104: sealing the liquid crystal pouring port with a sealing glue.

In some embodiments, the step S101 of respectively forming the first substrate 200 and the second substrate 300 and the supporting spacers 33 between the first substrate 200 and the second substrate 300, specifically includes: step S1: disposing a first flexible substrate 31 on a first glass substrate 7; disposing a second flexible substrate 35 on a second glass substrate 8; forming a first alignment layer 32 on a side of the first flexible substrate 31 away from the first glass substrate 7; forming a second alignment layer 34 on a side of the second flexible substrate 35 away from the second glass substrate 8.

In this step, the first flexible substrate 31 is attached to the first glass substrate 7 through an adhesive film 16, and the second flexible substrate 35 is attached to the second glass substrate 8 through the adhesive film 16. The first alignment layer 32 and the second alignment layer 34 are formed through processes of coating an alignment film material, rubbing, aligning, and curing. The first alignment layer 32 and the second alignment layer 34 are cured at about 100° C. for 60 minutes to 120 minutes, so as to avoid the influence of the residual solvent in the alignment layers on the long-term reliability of the light-adjusting structure 3. In this embodiment, two curing processes are performed on the first alignment layer 32 and the second alignment layer 34, respectively, the first curing process is performed in the process of forming the alignment layers, and the curing is performed at 100° C. for 90 minutes; and the second curing process is performed when the flexible substrates and the corresponding glass substrates are subsequently detached from each other, and the curing is performed at 150° C. for 20 minutes. The two curing processes by heating are favorable for the complete volatilization of the solvent in the alignment layers.

Step S2: forming the supporting spacers 33 on a side of the first alignment layer 32 away from the first flexible substrate 31.

Step S3: separating the first flexible substrate 31 from the first glass substrate 7; separating the second flexible substrate 35 from the second glass substrate 8.

In some embodiments, the step S102 of sequentially superposing the first toughened glass layer 1, the first adhesive layer 2, the first substrate 200, the supporting spacers 33, the second substrate 300, the second adhesive layer 4 and the second toughened glass layer 5, laminating the first toughened glass layer 1, the first adhesive layer 2, the first substrate 200, the supporting spacers 33, the second substrate 300, the second adhesive layer 4 and the second toughened glass layer 5 in the autoclave at the temperature in a range of 130° C. to 150° C. and the pressure in a range of 12 bar to 14 bar; forming the edge sealing structure 101 surrounding the first substrate 200 and the second substrate 300, the liquid crystal pouring port 10 in the edge sealing structure 101, and the gap formed by enclosing the edge sealing structure 101, the first substrate 200 and the second substrate 300, specifically includes: FIG. 14 which is a temperature-pressure curve for a laminating process according to embodiments of the present disclosure, FIG. 15 which is a schematic diagram of a distance between orthographic projections of corresponding edges of a flexible substrate and a toughened glass layer, and FIG. 16 which is a schematic diagram of a specific process flow of a laminating process. Referring to FIGS. 15 and 2, step S41: setting a distance s1 between orthographic projections of corresponding edges of the first flexible substrate 31 and the first toughened glass layer 1, which are superposed, on the first toughened glass layer 1 to be in a range of 3 mm to 5 mm; setting a distance s2 between orthographic projections of corresponding edges of the second flexible substrate 35 and the second toughened glass layer 5, which are superposed, on the second toughened glass layer 5 to be in a range of 3 mm to 5 mm.

Referring to FIG. 16, before step S41, the method further includes: performing pretreatment processes (such as cleaning, drying and the like) on the toughened glass layers; and drying and bending the toughened glass layers (for example, drying a surface of each of the toughened glass layers into a curved surface at a high temperature). Further, before step S41, the method further includes: drawing/cutting the first adhesive layer 2 and the second adhesive layer 4 (PVB adhesive) (i.e. cutting the adhesive layers into specific shapes); and conditioning the first adhesive layer 2 and the second adhesive layer 4.

Step S42: placing the superposed layer structure into a vacuum bag and vacuumizing the vacuum bag.

In the step, an opening of the vacuum bag is sealed by sleeving a rubber ring on the opening of the vacuum bag, and then the vacuum bag is vacuumized.

Step S43: putting the superposed layer structure packaged with the vacuum bag into the autoclave for laminating.

Process parameters of laminating in the autoclave are as follows: a temperature rise speed of 5° C./min; a temperature rise time in a range of 20 min to 25 min; a pressurizing speed of 0.7 bar/min; a holding temperature in a range of 130° C. to 150° C. and a pressure in a range of 12 bar to 14 bar for more than 10 min; a cooling time of 30 min; a pressure relief temperature of less than 50° C.

The assembling process in step S43 specifically includes: sealing the vacuum bag having the superposed layer structure with a rubber ring; primarily pressing and primarily pressing the batch-out, i.e. further vacuumizing the vacuum bag, such as cold vacuumizing for 4 to 5 hours to reach a vacuum degree of 70%, and then hot vacuumizing at 90° C.; then performing the assembling process at a high temperature (in a range of 130° C. to 150° C.) and a high pressure (in a range of 12 bar to 14 bar), for example, performing the assembling process at a temperature of 145° C. and a pressure of 12 bar for 50 minutes (referring to FIG. 14); and finally trimming, i.e., scraping redundant portions of the adhesive layers (PVB adhesive) at the peripheral edges of the assembled structure with a blade.

In the laminating process in step S102, after the first adhesive layer 2 and the second adhesive layer 4 are melted at a temperature in a range of 130° C. to 150° C. and a pressure in a range of 12 bar to 14 bar, the edge sealing structure 101 shown in FIG. 4 and FIG. 5 may be formed, that is, the edge sealing structure 101 clads the end faces at the peripheral edges of the first substrate 200 and the second substrate 300. The first adhesive layer 2 and the second adhesive layer 4 having such the function and the structure can be realized by adjusting thicknesses of the first adhesive layer 2 and the second adhesive layer 4. For example, the greater thicknesses of the first adhesive layer 2 and the second adhesive layer 4 are provided, so that the end faces at the peripheral edges of the first substrate 200 and the second substrate 300 can be cladded by the first adhesive layer and the second adhesive layer.

In some embodiments, referring to FIG. 6, at the position where the liquid crystal pouring opening 10 is formed, the first substrate 200 and the second substrate 300 extend outward from main bodies of the first substrate 200 and the second substrate 300, respectively, to form branches, and an end edge which each branch extends to is flush with the corresponding edges of the first toughened glass layer 1 and the second toughened glass layer 5, so that after the laminating, the formed liquid crystal pouring opening 10 is a capillary tube with the first substrate 200 and the second substrate 300 as the upper and lower sidewalls of the formed liquid crystal pouring opening 10 and the edge sealing structure 101 as the left and right sidewalls of the formed liquid crystal pouring opening 10.

Figure 18:
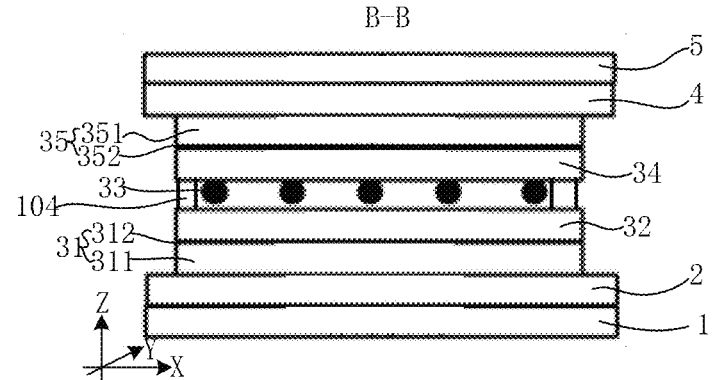
FIG. 18 is a cross-sectional view of a structure along a section line BB in FIG. 17.

In some embodiments, referring to FIGS. 17 and 18, FIG. 17 is a top view of a structure of sequentially stacked layers of a light-adjusting glass used for forming a structure in FIGS. 7 to 9 prior to laminating. FIG. 18 is a cross-sectional view of a structure along a section line BB in FIG. 17. The step S102 of sequentially superposing the first toughened glass layer 1, the first adhesive layer 2, the first substrate 200, the supporting spacers 33, the second substrate 300, the second adhesive layer 4 and the second toughened glass layer 5, laminating the first toughened glass layer 1, the first adhesive layer 2, the first substrate 200, the supporting spacers 33, the second substrate 300, the second adhesive layer 4 and the second toughened glass layer 5 in the autoclave at the temperature in a range of 130° C. to 150° C. and the pressure in a range of 12 bar to 14 bar; forming the edge sealing structure 101 arranged around the first substrate 200 and the second substrate 300, the liquid crystal pouring port 10 in the edge sealing structure 101, and the gap formed by enclosing the edge sealing structure 101, the first substrate 200 and the second substrate 300, further includes: before laminating, providing an adhesive strip 104 between the first substrate 200 and the second substrate 300; the adhesive strip 104 is correspondingly distributed at the peripheral edges of the first substrate 200 and the second substrate 300; and the adhesive strip 104 is broken at a corresponding position where the liquid crystal pouring port is formed.

In some embodiments, the adhesive strip 104 is made of the same material as the first adhesive layer 2 and the second adhesive layer 4; the material includes polyvinyl butyral (PVB) or ethylene-vinyl acetate (EVA) copolymer.

The specific process conditions and process parameters of laminating of the light-adjusting glass having the superposed structure as shown in FIGS. 17 and 18 before laminating, are the same as those in FIG. 13. For example, in the laminating process, after the adhesive strip 104 is melted at a temperature in a range of 130° C. to 150° C. and a pressure in a range of 12 bar to 14 bar, the first substrate 200 and the second substrate 300 are adhered together, so as to form the edge sealing structure 101 shown in FIG. 8; and after the first adhesive layer 2 is melted at the temperature in a range of 130° C. to 150° C. and the pressure in a range of 12 bar to 14 bar, the first substrate 200 and the first toughened glass layer 1 are adhered together; after the second adhesive layer 4 is melted at the temperature in a range of 130° C. to 150° C. and the pressure in a range of 12 bar to 14 bar, and then the second substrate 300 and the second toughened glass layer 5 are adhered together; however, the first adhesive layer 2 and the second adhesive layer 4 are melted and do not clad the end faces at the peripheral edges of the first substrate 200 and the second substrate 300. The first adhesive layer 2 and the second adhesive layer 4 having such the function and the structure can be realized by adjusting thicknesses of the first adhesive layer 2 and the second adhesive layer 4. For example, the small thicknesses of the first adhesive layer 2 and the second adhesive layer 4 are provided, so that the end faces at the peripheral edges of the first substrate 200 and the second substrate 300 are not cladded by the first adhesive layer and the second adhesive layer.

In some embodiments, the adhesive strip 104 is broken at the corresponding position where the liquid crystal pouring opening 10 is formed, so that the liquid crystal pouring port in the edge sealing structure 101 can be formed after the laminating. That is, the liquid crystal pouring opening is formed as a capillary tube with the first substrate 200 and the second substrate 300 as the upper and lower sidewalls of the liquid crystal pouring opening and the edge sealing structure 101 as the left and right sidewalls of the liquid crystal pouring opening.

Figure 19:
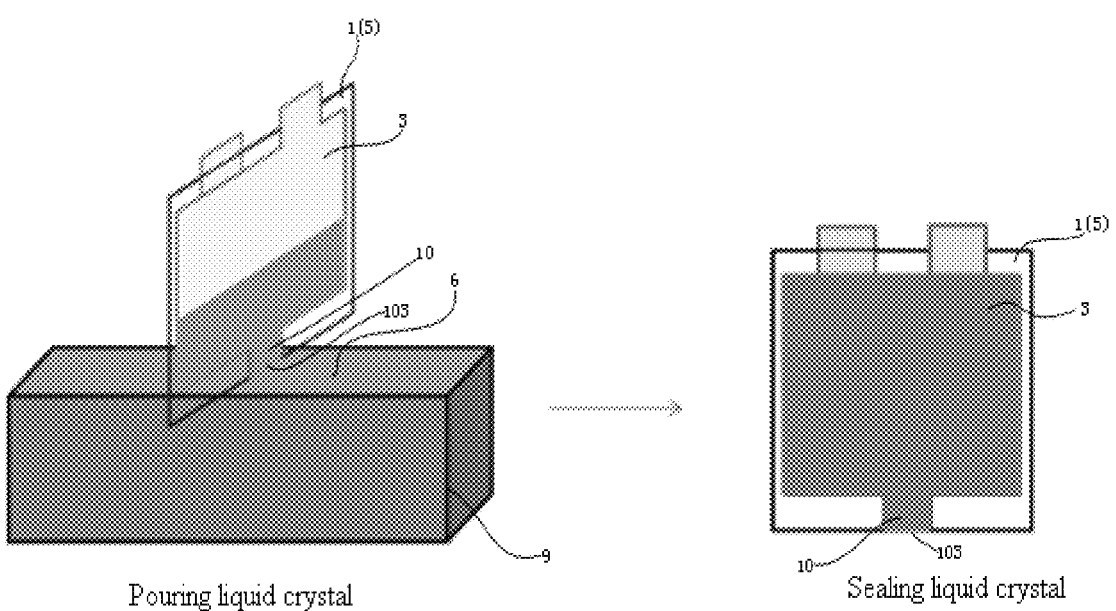
FIG. 19 is a schematic diagram of liquid crystal pouring.

In some embodiments, in the step S103, that is, in the process of pouring the gap with a liquid crystal 6 through the liquid crystal pouring port in a vacuum chamber at room temperature, referring to FIG. 19, FIG. 19 is a schematic diagram of liquid crystal pouring. The step S103 specifically includes: referring to FIGS. 19 and 3, vacuumizing the vacuum chamber to below 1 pa; placing the laminated superposed layer structure on a liquid crystal groove 9 containing the liquid crystal 6, so that the liquid crystal pouring port 10 of the superposed layer structure extends into the liquid crystal 6 in the liquid crystal groove 9; and the liquid crystal pouring port 10 is a capillary tube so that the liquid crystal 6 is poured into the gap under the vacuum capillary siphon action.

In the step S103, the laminated light-adjusting glass is placed on the liquid crystal groove 9, and then the vacuum chamber in which the liquid crystal groove 9 is placed is vacuumized to below 1 pa, and then vacuum capillary pouring is performed, so that the entire gap in the light-adjusting glass is fully filled with the liquid crystal, and finally the entire liquid crystal pouring port 10 is fully filled with the liquid crystal.

In some embodiments, the step S104 is sealing the liquid crystal pouring port 10 by using a sealing glue. That is, sealing the opening of the liquid crystal pouring port 10 by using a sealing glue, specifically includes: coating curing glue on a position of the opening of the liquid crystal pouring port 10; and curing the curing glue by light irradiation.

In some embodiments, the curing glue includes an ultraviolet curing glue. The specific process for sealing the liquid crystal pouring port 10 includes: coating a UV glue (ultraviolet curing glue) at a position of the opening of the liquid crystal pouring port 10; wherein the opening is fully coated with the UV glue; then curing the UV glue by irradiating the UV glue at the position of the opening with the UV light so that the cured UV glue can seal the opening, which prevents the external air from entering the liquid crystal pouring port 10 and the liquid crystal inside the liquid crystal pouring port 10 from flowing out. The process of sealing the liquid crystal pouring port 10 is performed in the vacuum chamber, which can ensure that the external air cannot enter the gap during sealing. The vacuum capillary pouring process is adopted to pour the liquid crystal into the gap inside the light-adjusting glass at room temperature, the liquid crystal 6 is less damaged at room temperature, and the residual gas in the gap internal the light-adjusting structure 3 may be removed by vacuumizing before the pouring process, so that the liquid crystal in the light-adjusting structure 3 is prevented from generating bubbles.

In some embodiments, when the entire liquid crystal pouring port 10 is to be fully filled with the liquid crystal (for example, when the liquid crystal pouring port 10 is filled with the liquid crystal, but the entire liquid crystal pouring port 10 is not fully filled with the liquid crystal), the opening of the liquid crystal pouring port 10 is immersed in the sealing glue (the sealing glue may be placed in an open container), at this time, the remaining portion of the liquid crystal pouring port 10 without the filled liquid crystal and the opening thereof are fully filled with the sealing glue under the capillary siphon action, and then the sealing glue is cured by light irradiation.

It should be noted that the sealing glue for the liquid crystal pouring port 10 cannot adopt the same material as the first adhesive layer 2 and the second adhesive layer 4, because in the present disclosure, the first substrate 200, the second substrate 300 and the toughened glass layers are firstly laminated through the first adhesive layer 2 and the second adhesive layer 4, then the liquid crystal 6 is poured, and finally the opening of the liquid crystal pouring opening 10 is sealed, so that a sealing process of the sealing glue cannot damage or affect the laminated structure. Therefore, the sealing glue is usually a light curing compound or the like, with a curing temperature not close to or exceeding a laminating temperature.

The above steps S101 to S104 specifically includes: respectively attaching the cut first flexible substrate 31 and the cut second flexible substrate 35 to the first glass substrate 7 and the second glass substrate 8 of 0.5 T to 0.7 T by using an adhesive film; then performing an alignment layer coating process, and drying the alignment layers formed by coating for 90 minutes at 100° C.; forming a pretilt angle of 3° to 5° through a rubbing alignment (here, the pretilt angle is a pretilt angle of the alignment layer of a TN-type (vertical electric field) liquid crystal cell; wherein the pretilt angles of the first alignment layer 32 and the second alignment layer 34 have a same magnitude and opposite directions; here, the pretilt angles of the alignment layers are not limited; and for liquid crystal cells of other display modes, the pretilt angle may have other magnitudes, which depends on the electric field mode of the liquid crystal cell); subsequently spraying 8 μm thick supporting spacer material (spherical particles) on the first alignment layer 32; curing at 100° C. for one hour to adhere the supporting spacers 33 and the first alignment layer 32 together; then, detaching the first flexible substrate 31 and the first glass substrate 7 from each other in the condition of the temperature is kept at 150° C. for 20 minutes, and detaching the second flexible substrate 35 and the second glass substrate 8 from each other directly under the same process condition; sequentially stacking the detached flexible substrates directly together with the toughened glass layers and the adhesive layers, wherein the distance between the corresponding edges of the flexible substrate and the toughened glass layer is in a range of about 3 mm to 5 mm; sheathing/packaging the whole light-adjusting glass stacked sequentially by using a vacuum bag, then vacuumizing the vacuum bag, and putting the vacuum bag into the autoclave for laminating; wherein the key process parameters of the laminating process are the temperature in a range of 130° C. to 150° C. and the pressure in a range of 12 bar to 14 bar and the duration of 50 minutes. After the laminating process, the temperature is reduced and the pressure is relieved. After the laminating process, the liquid crystal 6 is poured by vacuum into the gap in the light-adjusting glass.

Figure 20:
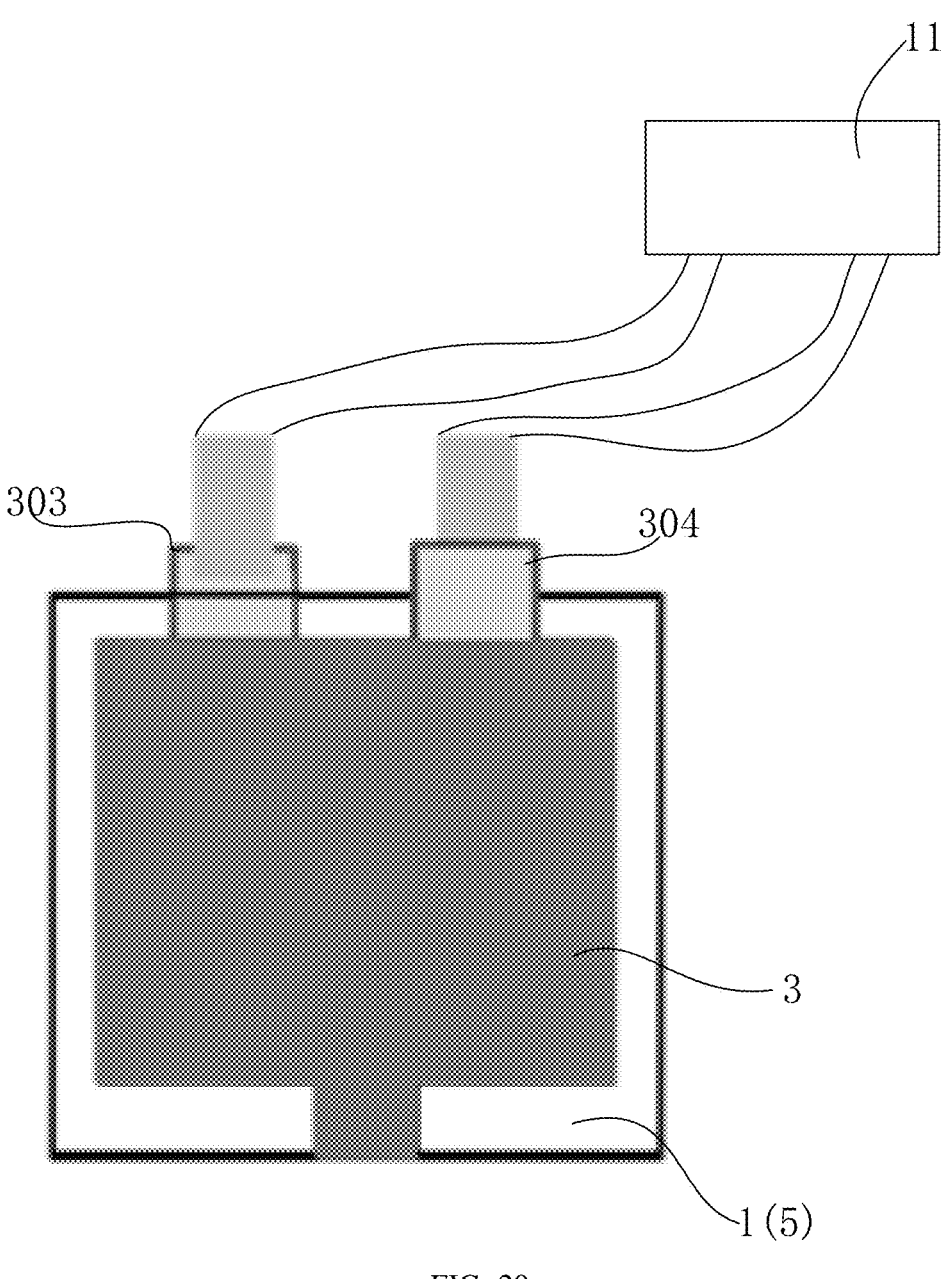
FIG. 20 is a schematic diagram of bonding connection between a bonding electrode and a driving circuit.

In this embodiment, referring to FIG. 20, FIG. 20 is a schematic diagram of bonding connection between a bonding electrode and a driving circuit. Referring to FIGS. 20, 4, 5 and 8, the first flexible substrate 31 includes a first flexible base 311 and a first electrode layer 312 formed on the first flexible base 311; the second flexible substrate 35 includes a second flexible base 351 and a second electrode layer 352 formed on the second flexible base 351; the first electrode layer 312 further extends to the outside of the edge sealing structure 101 and forms a first bonding electrode 303; the second electrode layer 352 further extends to the outside of the edge sealing structure 101 and forms a second bonding electrode 304; the manufacturing method also includes: bonding and connecting the first bonding electrode 303 and the second bonding electrode 304 to the driving circuit 11, respectively, so that the driving circuit 11 provides driving signals to the first bonding electrode 303 and the second bonding electrode 304.

In some embodiments, for the partitioned first electrode layer and the partitioned second electrode layer, and the first sub-regions of the first electrode layer and the second sub-regions of the second electrode layer may be bonded and connected to the driving circuit, respectively, so that the driving circuit may independently provide a driving signal to each first sub-region and each second sub-region, respectively, thereby realizing the separate light-adjusting of different partitions.

In some embodiments, referring to FIG. 20, the driving circuit 11 is bonded and connected to the first bonding electrode 303 and the second bonding electrode 304, respectively, by using a conductive adhesive film with an anisotropic property; wherein a diameter of each conductive particle in the conductive adhesive film with the anisotropic property is more than 10 μm (wherein the conductive particle is a gold ball particle); a thickness of the conductive adhesive film with the anisotropic property is more than 20 μm; a temperature in the bonding connection is in a range of 200° C. to 320° C.; a pressure in the bonding connection is in a range of 2 Kgf to 5 Kgf; a duration in the bonding connection is in a range of 10 s to 20 s. In the bonding connection, the conductive adhesive with the anisotropic property (that is, the ACF adhesive) is arranged between a bonding end of the driving circuit 11 and the corresponding bonding electrode, and the bonding end of the driving circuit 11 and the corresponding bonding electrode are bonded in a pressing way under the above process conditions. The bonding principle is: the gold ball particles positioned between the bonding end and the corresponding bonding electrode are flattened, to realize the conductive connection between the bonding end and the corresponding bonding electrode.

Figure 21:
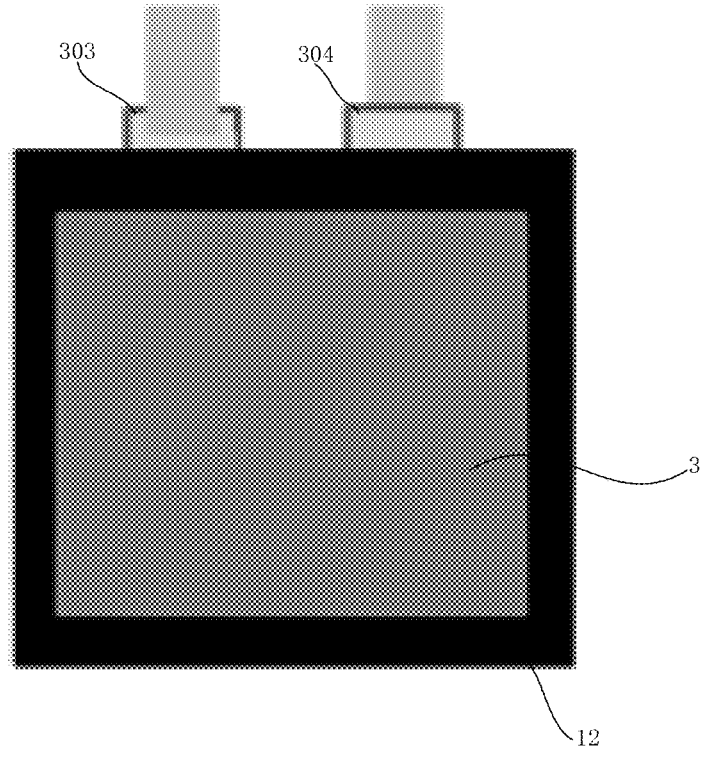
FIG. 21 is a schematic diagram of ink printing on a peripheral frame region of a light-adjusting glass.

In some embodiments, referring to FIG. 21, FIG. 21 is a schematic diagram of ink printing on a peripheral frame region of a light-adjusting glass. The method for manufacturing a light-adjusting glass further includes: printing ink 12 on the peripheral frame region of the light-adjusting glass; a width of the frame region where the ink 12 is printed is in a range of 5 mm to 15 mm. The ink 12 is printed on the frame region, which can prevent the light leakage at the edges of the light-adjusting glass.

The ink 12 may completely cover peripheral edges of the edge sealing structure, the first bonding electrode, the second bonding electrode, the first toughened glass layer and the second toughened glass layer, which are located in the frame region, so that the light leakage of the frame region of the light-adjusting glass through the transparent edge sealing structure, the first toughened glass layer and the second toughened glass layer can be better prevented.

Compared with the procedure for manufacturing the flexible liquid crystal light-adjusting glass in the prior art, the method for manufacturing a light-adjusting glass in the embodiment includes laminating the first toughened glass layer 1, the first adhesive layer 2, the first substrate 200, the supporting spacers 33, the second substrate 300, the second adhesive layer 4 and the second toughened glass layer 5 which are stacked, in the autoclave at a high temperature (in a range of 130° C. to 150° C.) and at a high pressure (in a range of 12 bar to 14 bar); and then, the liquid crystal 6 is poured in the vacuum chamber at room temperature (such as the room temperature of 25° C.) through the vacuumizing process, so that the flexible light-adjusting structure 3 in the light-adjusting glass and the alignment layer, the supporting spacers 33 and the liquid crystal 6 in the flexible light-adjusting structure 3 have a more stable performance, the whole light-adjusting glass has no defect such as bubbles generated in the laminating process, the product yield is more controllable, and the performance is better.

The embodiments of the present disclosure also provide a vehicle, which includes the light-adjusting glass in the above embodiments, and the light-adjusting glass is used as a window of the vehicle.

It can be realized by adopting the light-adjusting glass in the above embodiments while realizing that the vehicle window can regulate the light that the vehicle window is double-curve and not fragile, does not have the problem that fragments threaten personal safety, has a low haze value (less than 1), which can satisfy a vehicle regulation standard, and has a quick response (less than 40 ms), which can satisfy the vehicle window standard requirement. The short response time can satisfy a traffic quick response requirement well.

The vehicle may be: an automobile, a train, an airplane, a motorcycle, or any other vehicle or product with a light-adjusting glass.

It should be understood that, the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A light-adjusting glass, comprising: a first toughened glass layer, a first adhesive layer, a first substrate, a second substrate, a second adhesive layer, and a second toughened glass layer which are sequentially stacked, and supporting spacers between the first substrate and the second substrate;

wherein the first adhesive layer is sandwiched between the first toughened glass layer and the first substrate, and the second adhesive layer is sandwiched between the second toughened glass layer and the second substrate, wherein the light-adjusting glass further comprises an edge sealing structure, which is arranged around the first substrate and the second substrate, the edge sealing structure comprises an enclosing part, the enclosing part is in contact with the first adhesive layer, extends to the second adhesive layer in a direction from the first toughened glass to the second toughened glass to be in contact with the second adhesive layer, and the enclosing part, the first substrate and the second substrate are enclosed to form a gap; the gap is filled with a liquid crystal;

the enclosing part extends along and is in contact with end faces at peripheral edges of the first substrate and the second substrate, and an orthographic projection of the enclosing part on the first toughened glass layer does not overlap with orthographic projections of the first substrate and the second substrate on the first toughened glass layer;

the enclosing part, the first adhesive layer and the second adhesive layer have a one-piece structure, and the edge sealing structure is opened with a liquid crystal pouring port; the enclosing part is disconnected at the liquid crystal pouring port to form an opening of the liquid crystal pouring port, and a sealing glue is arranged at the opening of the liquid crystal pouring port to seal the opening.

2. The light-adjusting glass of claim 1, wherein the edge sealing structure further comprises a clamping part, the clamping part is around a periphery of the gap and is connected to the enclosing part; and an orthographic projection of the clamping part on the first toughened glass layer overlaps with an orthographic projection of the peripheral edges of the first substrate and the second substrate on the first toughened glass layer.

3. The light-adjusting glass of claim 1, wherein the edge sealing structure is made of a same material as the first adhesive layer and the second adhesive layer; and the material comprises polyvinyl butyral or ethylene-vinyl acetate copolymer.

4. The light-adjusting glass of claim 1, wherein the first substrate comprises a first flexible substrate and a first alignment layer sequentially stacked in a direction away from the first adhesive layer;

the second substrate comprises a second alignment layer and a second flexible substrate sequentially stacked in the direction close to the second adhesive layer;

24 the first flexible substrate comprises a first flexible base and a first electrode layer; the first electrode layer is on a side of the first flexible base close to the first alignment layer;

the second flexible substrate comprises a second flexible base and a second electrode layer; the second electrode layer is on a side of the second flexible base close to the second alignment layer; and the supporting spacers are between the first alignment layer and the second alignment layer.

5. The light-adjusting glass of claim 4, wherein the first flexible base and the second flexible base extend to a region corresponding to the liquid crystal pouring port, respectively.

6. The light-adjusting glass of claim 5, wherein the supporting spacers are further distributed in the region corresponding to the liquid crystal pouring port between the first flexible base and the second flexible base.

7. The light-adjusting glass of claim 5, wherein at least one of the first electrode layer, the second electrode layer, the first alignment layer, and the second alignment layer extends to the region corresponding to the liquid crystal pouring port.

8. The light-adjusting glass of claim 4, wherein a curvature radius of the first flexible substrate curved along a first direction is greater than 1800 mm;

a curvature radius of the first flexible substrate curved along a second direction is greater than 2000 mm;

a curvature radius of the second flexible substrate curved along the first direction is greater than 1800 mm;

a curvature radius of the second flexible substrate curved along the second direction is greater than 2000 mm; and the first direction and the second direction are perpendicularly crossed with each other to form a rectangular plane coordinate system.

9. The light-adjusting glass of claim 4, wherein a transmittance of the first flexible substrate is greater than 80%; and a transmittance of the second flexible substrate is greater than 80%.

10. The light-adjusting glass of claim 4, wherein a thermal shrinkage rate of the first flexible substrate along a first direction is less than 0.03%;

a thermal shrinkage rate of the first flexible substrate along a second direction is less than 0.03%;

a thermal shrinkage rate of the second flexible substrate along the first direction is less than 0.03%; and a thermal shrinkage rate of the second flexible substrate along the second direction is less than 0.03%.

11. The light-adjusting glass of claim 4, wherein the first flexible substrate has a thickness in a range of 40 μm to 200 μm; and the second flexible substrate has a thickness in a range of 40 μm to 200 μm.

12. The light-adjusting glass of claim 4, wherein the first flexible substrate has a thickness in a range of 170 μm to 200 μm; and the second flexible substrate has a thickness in a range of 170 μm to 200 μm.

13. The light-adjusting glass of claim 4, wherein the first flexible base is fully covered by the first electrode layer; the second flexible base is fully covered by the second electrode layer; or the first electrode layer is divided into at least two first sub-regions, and two adjacent first sub-regions are spaced from each other; the second electrode layer is divided into at least two second sub-regions, and two adjacent second sub-regions are spaced from each other; the at least two first sub-regions and the at least two second sub-regions are in a one-to-one correspondence with each other and orthographic projections of the first sub-region and the second sub-region corresponding to each other on the first flexible base coincide with each other.

14. The light-adjusting glass of claim 13, wherein a sheet resistance of the first electrode layer is in a range of 20Ω/□ to 200Ω/□; and a sheet resistance of the second electrode layer is in a range of 20Ω/□ to 200Ω/□.

15. The light-adjusting glass of claim 1, wherein the liquid crystal comprises dye liquid crystal; and a tolerable temperature of the dye liquid crystal is in a range of –40° C. to 150° C.

16. The light-adjusting glass of claim 4, wherein a curing temperature of an alignment liquid for the first alignment layer is in a range of 80° C. to 150° C.;

a curing temperature of an alignment liquid for the second alignment layer is in a range of 80° C. to 150° C.; and materials of the first adhesive layer and the second adhesive layer are in a melted state under conditions that a temperature is in a range of 130° C. to 150° C. and a pressure is in a range of 12 bar to 14 bar, and are solidified after being cooled.

17. The light-adjusting glass of claim 4, wherein the supporting spacers are spherical particles;

each of the supporting spacers comprises a spherical body and an outer cladding layer, and the outer cladding layer is wrapped on a surface of the spherical body; and a color of the outer cladding layer comprises black.

18. A vehicle, comprising the light-adjusting glass of claim 1, wherein the light-adjusting glass is used as a window of the vehicle.

\* \* \* \* \*